United States Patent [19]

Doyama et al.

[11] Patent Number: 5,236,988
[45] Date of Patent: Aug. 17, 1993

[54] ENGINEERING PLASTIC COMPOSITION AND ARTICLES MADE OF THE SAME

[75] Inventors: Kazuo Doyama, Suita; Makoto Yamaguchi, Takatsuki; Makoto Ohsuga, Osaka; Akihiro Niki, Kyoto; Toranosuke Saito, Ibaraki; Hiroki Tsunomachi, Ibaraki; Daishiro Kishimoto, Ibaraki, all of Japan

[73] Assignees: Sekisui Chemical Co., Ltd.; Kabushiki Kaisha Sanko Kaihatsu Kagaku Kenkyusho, both of Osaka, Japan

[21] Appl. No.: 587,924

[22] Filed: Sep. 25, 1990

[30] Foreign Application Priority Data

Sep. 26, 1989 [JP] Japan ................. 1-249998
Sep. 28, 1989 [JP] Japan ................. 1-252824
Oct. 9, 1989 [JP] Japan ................. 1-263475
Feb. 26, 1990 [JP] Japan ................. 2-46866

[51] Int. Cl.$^5$ .............. C08L 59/02; C08L 67/02; C08L 69/00; C08L 77/00; C08L 71/10; C08L 71/12; C08L 79/08; C08L 81/00
[52] U.S. Cl. ................... 524/404; 524/441; 524/443; 524/537; 524/538; 524/539; 525/397; 525/400; 525/425; 525/437; 525/439; 525/444
[58] Field of Search .............. 525/444, 397, 400, 425, 525/437, 439; 524/539, 537, 538, 404, 441, 443; 528/195

[56] References Cited

U.S. PATENT DOCUMENTS

| | | |
|---|---|---|
| D. 926,008 | 9/1874 | Weaver . |
| 4,134,874 | 1/1979 | Needham ................. 260/37 |
| 4,189,549 | 2/1980 | Matsunaga ............... 525/439 |
| 4,246,381 | 1/1981 | Robeson ................. 525/444 |
| 4,386,174 | 5/1983 | Cogswell ................ 524/27 |
| 4,451,607 | 5/1984 | Garcia et al. ........... 524/494 |
| 4,481,325 | 11/1984 | Giles, Jr. ............. 524/320 |
| 4,562,231 | 12/1985 | Dean .................... 525/189 |
| 4,581,399 | 4/1986 | Yoon .................... 524/246 |
| 4,587,299 | 5/1986 | Giles, Jr. .............. 525/92 |
| 4,778,855 | 10/1988 | Boutni .................. 525/146 |
| 4,904,752 | 2/1990 | Kanoe ................... 528/97 |

FOREIGN PATENT DOCUMENTS

| | | |
|---|---|---|
| 0344099 | 11/1989 | European Pat. Off. . |
| 50-144750 | 11/1975 | Japan . |
| 50-146648 | 11/1975 | Japan . |
| 54-47752 | 4/1979 | Japan . |
| 56-167752 | 12/1981 | Japan . |
| 57-49046 | 3/1982 | Japan . |
| 57-108153 | 7/1982 | Japan . |
| 57-172954 | 10/1982 | Japan . |
| 58-42648 | 3/1983 | Japan . |
| 59-12967 | 1/1984 | Japan . |
| 59-20354 | 2/1984 | Japan . |
| 59-85733 | 5/1984 | Japan . |
| 59-204652 | 11/1984 | Japan . |
| 59-217760 | 12/1984 | Japan . |
| 60-156753 | 8/1985 | Japan . |
| 60-156754 | 8/1985 | Japan . |
| 61-26567 | 2/1986 | Japan . |
| 61-44897 | 3/1986 | Japan . |
| 61-44928 | 3/1986 | Japan . |
| 61-66750 | 4/1986 | Japan . |

OTHER PUBLICATIONS

Patent Abstracts of Japan, vol. 8, No. 232 (C-248) [1669], Oct. 25, 1984 of JP-A-59 113 055 (Dai Nippon Inc.) Jun. 29, 1984.
Patent Abstracts of Japan, vol. 14, No. 318 (C-738) [4261], Jul. 9, 1990 of JP-A-2 110 130 (Sekisu Chem. Co.) Apr. 23, 1990.
Patent Abstracts of Japan, vol. 13, No. 442 (C-641) [3790], Oct. 4, 1989 of JP-A-1 170 654 (Polyplastics) Jul. 5, 1989.
Patent Abstracts of Japan, vol. 12, No. 358 (C-351), Sep. 26, 1988 of JP-A-63 112 652 (Idemitsu Petrochem).

Primary Examiner—Patricia A. Short
Attorney, Agent, or Firm—Armstrong, Westerman, Hattori, McLeland & Naughton

[57] ABSTRACT

An engineering plastic composition with excellent flowability, heat stability, and desirable mechanical properties is provided. The composition contains an engineering plastic material and an aliphatic polyester.

21 Claims, No Drawings

ENGINEERING PLASTIC COMPOSITION AND ARTICLES MADE OF THE SAME

BACKGROUND OF THE INVENTION

1. Field of the Invention

This invention relates to an engineering plastic composition with excellent flowability, heat stability, and desirable mechanical properties, and to articles made of the same.

2. Description of the Prior Art

Many resins are known as engineering plastic materials. They include polyetherimide, polyarylketone, aromatic polysulfone resin, polyarylenesulfide, polyarylate, saturated polyester (liquid crystal polyester), polyamide-imide, polycarbonate, polyphenylene oxide, polyamide, polyoxymethylene, etc. These engineering plastic materials can be used in various kinds of articles that require a high-performance material with qualities such as excellent heat stability and mechanical properties. However, in general, the melt viscosities of engineering plastic materials are high, and as a result, the workability of the materials is poor. Therefore, it is not easy to use these engineering plastic materials for products which must be formed with accuracy. For these reasons, there is a need for an engineering plastic composition that has a low melt viscosity, that is, satisfactory flowability, and workability, during molding.

In general, as methods by which the melt viscosity of polymers can be lowered, the following two methods have been adopted: (1) to decrease the molecular weight of the polymer, and (2) to add a plasticizer or to add a processing aid.

When the first method is used, the tensile strength, the impact strength, and other mechanical properties of the articles that are made of the polymer are worsened, and the heat stability of the articles declines. In the second method, many of the substances that can provide engineering plastic materials with plasticity have poor heat stability, so that these substances are not stable at the molding temperature for the engineering plastic materials. For these reasons, a plasticizer or processing aid that is effective with engineering plastic materials has not yet been found.

Many attempts have been made to improve the moldability or workability of engineering plastic materials. With respect to the engineering plastic materials listed above, the characteristics and the methods for the improvement of the moldability or workability will be described below in detail.

(a) Polyetherimide

Since polyetherimide has a high glass transition temperature of 217° C., it is used as a thermoplastic resin with heat stability. However, the melt viscosity of polyetherimide is high, so the moldability is poor and it is not easy to use these engineering plastic materials for products which must be formed with accuracy.

In order to improve the moldability of polyetherimide, methods that involve the blending of polyetherimide with other thermoplastic resins have been proposed. For example, there are methods in which polyarylether with a low molecular weight is included in a blend (Japanese Laid-Open Patent Publication No. 59-12967), in which polyalkyl lactone with a molecular weight within specified limits is included in a blend (Japanese Laid-Open Patent Publication No. 60-156754), and in which a block copolymer made of vinyl aromatic compounds and diene compounds is included in a blend (Japanese Laid-Open Patent Publication No. 60-156753). However, compared to the heat stability of polyetherimide, the heat stability of all of these thermoplastic resins is low. Therefore, in these methods, the heat stability of the polyetherimide compound is decreased.

(b) Polyarylketone

Polyarylketone is used for applications which require high performance with qualities, as a thermoplastic resin with excellent heat, hydrolysis and solvent stability, and desirable mechanical strength. However, the melt viscosity of polyarylketone is also high, so it is not easy to use these engineering plastic materials for products to be formed with accuracy.

A method has been proposed in which the moldability of polyarylketone is improved by its being blended with polyphenylenesulfide (Japanese Laid-Open Patent Publication No. 57-172954). In this method, in order that the moldability will be improved sufficiently, it is necessary to include a large amount (tens of percents by weight based on the total weight of the resin) of polyphenylenesulfide in the blend. For this reason, the excellent mechanical properties of polyarylketone decline.

(c) Aromatic polysulfone resin

Aromatic polysulfone resin is used in various kinds of articles as a thermoplastic resin with excellent heat stability. However, the melt viscosity of aromatic polysulfone resin is also high, so the moldability is poor and it is not easy to use these engineering plastic materials for products which must be formed with accuracy.

In order to improve the flowability of resins, methods that involve the blending of the aforementioned resin with other thermoplastic resins have been proposed besides the aforementioned method. For example, there is a method in which polyurethane is blended with aromatic polysulfone resin (Japanese Laid-Open Patent Publication No. 50-144750); there is another method in which polyalkylene-phenylene ester or polyalkylene-phenylene ether is blended with aromatic polysulfone resin (Japanese Laid-Open Patent Publication No. 50-146648); there is still another method in which a copolymer of an aromatic vinyl monomer and maleimide monomer is blended with aromatic polysulfone resin (Japanese Laid-Open Patent Publication No. 61-66750); and there is a further method in which a copolymer of acrylonitrile, butadiene, and styrene is blended with aromatic polysulfone resin (Japanese Laid-Open Patent Publication No. 56-167752). The heat stability of all of the thermoplastic resins used in the above methods is inferior to that of aromatic polysulfone resin. For that reason, the excellent heat stability of the aromatic polysulfone resin is decreased by their use.

(d) Polyarylenesulfide

Polyarylenesulfide is a resin with excellent heat stability. Particularly, reinforced polyarylenesulfide, making use of the good affinity for various fillers and reinforcing fibers, has excellent mechanical properties, heat stability and electric properties. In order to improve the flowability of polyarylenesulfide, methods have been proposed in which solid polyethylene is added to polyarylenesulfide (Japanese Laid-Open Patent Publication No. 54-47752) and in which a block copolymer of hydrogenated conjugated dienes and aromatic compounds with one vinyl group is added to polyarylenesulfide (Japanese Laid-Open Patent Publication No. 59-217760). However, with these techniques, because the heat stability of the polymers used is inferior to that of the polyarylenesulfide, the superior heat stability of the polyarylenesulfide is decreased.

(e) Polyarylate

When polyarylate is prepared by polymerization, an agent for regulating the molecular weight is added, said agent being a monohydric aliphatic alcohol or an aliphatic monocarboxylic acid, and accordingly it is possible to obtain polyarylate with a comparatively low molecular weight. This method has been proposed (Japanese Patent Publication No. 57-49046). Other methods that have been proposed include a method in which a branching agent such as alcohol that has three or more hydroxyl groups is used (Japanese Patent Publication No. 61-26567). However, in such methods, the excellent mechanical and other properties of the polyarylate are worsened.

(f) Saturated polyester (Liquid crystal polyester)

Saturated polyester has excellent mechanical properties, heat stability, electrical properties, and the like. Particularly, liquid crystal polyester has excellent heat stability, high strength, excellent modulus of elasticity, and a low linear expansion coefficient, so it is used for parts such as machine parts and electrical parts which require high performance with these qualities. In order to improve the mechanical properties of polyester, a method has been proposed in which stiffeners such as reinforcing fibers or fillers are added to liquid crystal polyester. However, when these additives are added, the flowability is decreased. Therefore, it is necessary to raise the molding temperature when thin articles or articles with complex structures are molded, but resins are degraded during a prolonged heating in a molder with a high temperature and hence desirable molded articles cannot be obtained.

In order to improve the flowability of polyester, a method has been proposed in which a small amount of a liquid crystal compound of low molecular weight is blended with liquid crystal polyester (Japanese Laid-Open Patent Publication No. 59-85733). However, because the liquid-crystal transition temperature of liquid crystal compounds of low molecular weight is relatively low, the heat stability of the polyester is decreased.

(g) Polyamide-imide

Polyamide-imide has a high glass transition temperature of 280° C.-290° C., so it is used for applications which require high performance, as a thermoplastic resin with excellent mechanical properties at a high temperature. However, the melt viscosity of polyamide-imide is high, so it is necessary to mold at a high temperature of 320° C.-350° C. and the viscosity is prone to increase because of the molecular chain elongation reaction occurring when heating at 360° C. or more. Therefore, it is not easy to use polyamide-imide for products which must be formed with accuracy.

In order to improve the flowability of polyamide-imide, a method has been proposed in which an aromatic aminocarboxylic acid or its derivative or else an aromatic diamine with one of its amino groups masked is added as an agent to regulate the molecular weight when polyamide-imide is polycondensed (Japanese Laid-Open Patent Publication No. 61-44928). However, although the moldability and workability of the polyamide-imide obtained by this method are good, the density of cross-linking caused by the reaction that takes place in the polyamide-imide during the time of post-curing is decreased, so that the excellent qualities of polyamide-imide cannot be maintained.

(h) Polycarbonate

Polycarbonate has a high glass transition temperature of 140° C.-150° C., and its mechanical properties, dimensional stability and transparency are extremely good. Because of its mechanical properties, heat stability and other qualities, polycarbonate is suitable for use in machine parts, electrical parts, optical parts, and other products in which high performance is needed. On the other hand, polycarbonate has excellent impact strength, but the problem is that the value of impact strength is prone to change with the thickness of the articles.

When polycarbonate is used as a resin in machine parts or electrical parts, in order to increase the mechanical properties of the part, reinforcing fibers such as glass fibers and fillers such as silica are added to the polycarbonate. However, the impact strength of a polycarbonate composition in which these are added generally decreases; and high temperatures of 300° C.-360° C. are needed in molding. If this composition is heated to 350° C. or more, the product may be discolored.

Therefore, there is a strong need for a polycarbonate resin composition with low melt viscosity, that is, excellent flowability, excellent moldability, and high impact strength.

In order to obtain a polycarbonate resin composition with improved impact strength, a method in which α-olefin glycidyl(meth)acrylate copolymer is blended with polycarbonate (Japanese Laid-Open Patent Publication No. 61-44897) has been proposed. However, the problem is that the excellent heat stability of polycarbonate is greatly decreased. Besides the aforementioned method, another method in which polycarbonate is blended with other polymers has been proposed. Particularly, a mixture with polystyrene resins is most popular and acceptable on the market. For example, IUPILON ® available from Mitsubishi Gas Chemical Company Inc., MALTILON ® available from Teijin Kasei Corp., and NOVAMATE ® available from Mitsubishi Kasei Corp. are commercially available. And if a new complex with polycarbonate is developed, a new market is opened up which is of very great importance.

(i) Polyphenylene oxide

Polyphenylene oxide (PPO resin) is an engineering plastic material with excellent heat stability. However, for reasons such as poor moldability and low impact strength, various methods have been proposed in order to solve the problems. For example, in order to improve the moldability of polyphenylene oxide, a method in which polyphenylene oxide is blended with other polymers has been proposed and polymerblended mixtures, for example, polyphenylene oxide/styrene or polyphenylene oxide/nylon are commercially available. For example, NORYL ® and NORYL GTX ® available from GE Corp., XYRON ® available from Asahi Chemical Industry Co., Ltd., YUPIACE ® available from Diamarl are known.

However, in a composition of polyphenylene oxide that contains a large amount of polystyrene or nylon, the moldability is improved but the heat stability is decreased. When glass fibers are added to these blends, the heat stability and mechanical properties of the mixtures obtained are excellent, but the flowability is poor and the moldability declines.

Other methods have also been proposed. For example, there is a method in which a copolymer of a vinyl aromatic compound and an unsaturated dicarboxylic anhydride is blended with polyphenylene oxide (Japanese Laid-Open Patent Publication No. 58-42648); there is another method in which polyalkylene glycol is blended with polyphenylene oxide (Japanese Laid-Open Patent Publication No. 59-20354); and there is still another method in which olefin groups and glycidyl(meth)acrylate copolymer is blended with polyphenylene oxide (Japanese Laid-Open Patent Publication No. 57-108153). In these methods also, however, the heat stability of the polyphenylene oxide is worsened.

(j) Polyamide

Polyamide has excellent mechanical properties, heat stability and wear resistance and is used, making use of these excellent properties, in various kinds of articles such as machine parts and electrical parts which require high performance. In order to further improve the mechanical properties of this resin, a method has been proposed in which stiffeners such as reinforcing fibers or fillers are added. However, when these additives are added, the flowability is decreased. Therefore, it is necessary to raise the molding temperature when thin articles or articles with complex structures are molded, but resins are degraded during the prolonged heating in a molder with a high temperature and hence desirable molded articles cannot be obtained.

(k) Polyoxymethylene

Polyoxymethylene has excellent mechanical properties, heat stability and dimensional stability, so it is widely used in parts such as machine parts, electrical parts, automotive parts, as an engineering plastic material with well-balanced properties.

Recently, according to various needs on the market, polyoxymethylenes suitable for each application have been developed. Complexation between polyoxymethylene and other resins is an effective means to change the properties. For example, in order to improve the impact strength of polyoxymethylene, polymer alloy in which polyoxymethylene is complexed with urethane thermoplastic elastomer is commercially available. A method in which a specific modified α-olefin polymer is blended with polyoxymethylene is disclosed in Japanese Laid-Open Patent Publication No. 59-204652, in order to improve the impact strength of polyoxymethylene. However, these methods decrease the heat stability of polyoxymethylene.

When polyoxymethylene is used as a resin in machine parts or electrical parts, in order to increase the mechanical properties of the part, reinforcing fibers such as glass fibers and fillers such as silica are added to the polyoxymethylene. However, the impact strength of a polyoxymethylene composition in which these are added, generally decreases; and, moreover, the flowability decreases. Therefore, it is necessary to mold at a high temperature but the resin is prone to degrade.

Therefore, there is a strong need for a polyoxymethylene composition with low melt viscosity, that is, excellent workability, excellent moldability, and high impact strength.

SUMMARY OF THE INVENTION

An engineering plastic composition of the present invention, which overcomes the above-discussed and numerous other disadvantages and deficiencies of the prior art, comprises an engineering plastic material and an aliphatic polyester, wherein said aliphatic polyester contains, as components, an aliphatic dicarboxylic acid of formula I; an aliphatic diol; and at least either a dihydroxy compound of formula II or a monohydroxy compound of formula III:

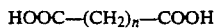

HOOC—(CH$_2$)$_n$—COOH  [I]

(wherein n is an integer of 0 to 10)

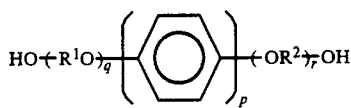

(wherein R$^1$ and R$^2$ are, independently, alkylene, p is 3 or 4, and q and r, independently, are 0 or integers of 1 or more)

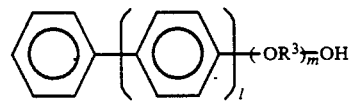

(wherein R$^3$ is alkylene, l is 2 or 3, and m is 0 or an integer of 1 or more).

In a preferred embodiment, said engineering plastic material is at least one selected from the group consisting of polyetherimide, polyarylketone, aromatic polysulfone resin, polyarylenesulfide, polyarylate, saturated polyester (liquid crystal polyester), polyamide-imide, polycarbonate, polyphenyleneoxide, polyamide, and polyoxymethylene.

In a preferred embodiment, said aliphatic polyester contains said aliphatic dicarboxylic acid, said aliphatic diol and said dihydroxy compound, as components thereof, wherein said dihydroxy compound is present in an amount of from 0.1 to 30 mol % based on the total amount of monomer of said aliphatic polyester.

In a preferred embodiment, said aliphatic polyester contains said aliphatic dicarboxylic acid, said aliphatic diol and said monohydroxy compound, as components thereof, wherein said monohydroxy compound is present in an amount of from 0.1 to 20 mol % based on the total amount of monomer of said aliphatic polyester.

In a preferred embodiment, the total amount of said dihydroxy compound and said monohydroxy compound added is from 0.1 to 30 mol % based on the total amount of monomer of said aliphatic polyester.

In a preferred embodiment, said dihydroxy compound is one selected from 4,4″-dihydroxy-p-terphenyl, 4,4‴-dihydroxy-p-quaterphenyl, or 4,4‴-di(2-hydroxyethoxy)-p-quaterphenyl.

In a preferred embodiment, reinforcing fibers are present in an amount of from 1.0 to 400 parts by weight for each 100 parts by weight of said engineering plastic composition.

In a preferred embodiment, said reinforcing fiber is at least one selected from the group consisting of glass fibers, carbon fibers, boron fibers, silicon carbide fibers, graphite fibers, alumina fibers, amorphous-metal fibers, silicon-titanium-carbon inorganic fibers, and aramide fibers.

In a preferred embodiment, an article is obtained from said engineering plastic composition by a melt-molding technique.

In a preferred embodiment, said melt-molding technique is one selected from the group consisting of compression molding, extrusion molding, injection molding, and blow-molding.

Thus, the invention described herein makes possible the objectives of: (1) providing an engineering plastic composition that has excellent workability, as well as excellent heat stability and superior mechanical properties that originate from the said engineering plastic material contained therein; (2) providing an engineering plastic composition that has excellent heat stability and mechanical properties which an engineering plastic material originally has and the impact strength of which is further improved; (3) providing an engineering plastic composition that is rubbery elasticity and has excellent heat stability; (4) providing an engineering plastic composition that can be used in electronic products, film, sheets, pipes, and the like, in which high heat stability and superior mechanical properties are needed, and in paints, adhesives, fibers, and the like in which high heat stability is needed; (5) providing an engineering plastic composition that has excellent flowability even when it contains reinforcing fibers, so that the moldability is satisfactory, and also has the excellent qualities described in (1) to (4) above; and (6) providing an article obtained from the above-mentioned engineering plastic composition, which has superior heat stability and mechanical properties.

DESCRIPTION OF THE PREFERRED EMBODIMENTS

Engineering plastic materials that can be used in this invention include polyetherimide, polyarylketone, aromatic polysulfone resin, polyarylenesulfide, polyarylate, saturated polyester (liquid crystal polyester), polyamide-imide, polycarbonate, polyphenyleneoxide, polyamide, polyoxymethylene, etc.

The polyetherimide mentioned above is a polymer that has essentially ether-bonds and imide bonds. The polymer with a repeating unit of formula IV as the major component is preferred:

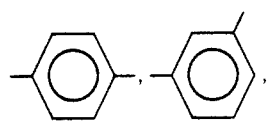

wherein $Ar^1$ is a divalent aromatic group that contains at least one six-membered carbon ring, such as, for example

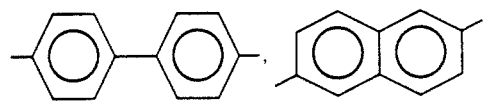

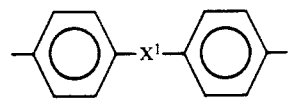

wherein $X^1$ is —O—, —S—, —CO—, —SO$_2$— —SO—, or alkylene that contains 1 to 5 carbon atoms.

$Ar^2$ is a divalent aromatic group, such as, for example,

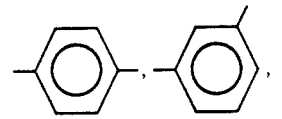

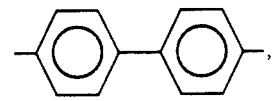

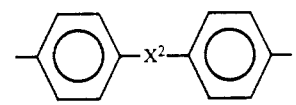

wherein $X^2$ is —O—, —S—, —CO—, —SO$_2$—, —SO—, or alkylene that contains 1 to 5 carbon atoms.

In this invention, the polyetherimide with a repeating unit of the following formula as the main component is particularly preferred, for example, ULTEM ® available from GE Corp.

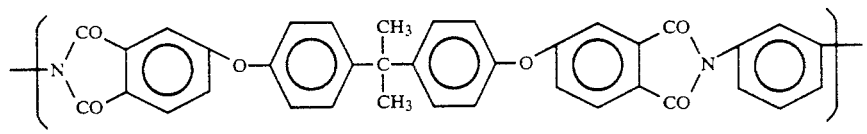

As the polyarylketone mentioned above, a polymer with a repeating unit of formula V as the main component is preferred:

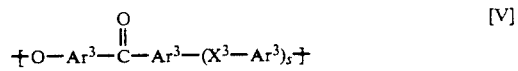

wherein the $Ar^3$ groups, independently, are divalent aromatic groups with at least one six-membered carbon ring such as, for example,

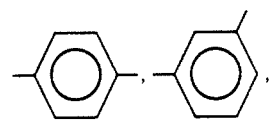

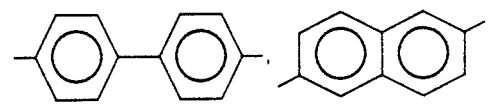

or the like.

$X^3$ is, independently, —O—, —CO—, or a direct bond, and s is an integer from 0 to 3.

In this invention, polyarylketone that has the repeating unit V-I and polyarylketone that has the repeating unit V-II are particularly preferred:

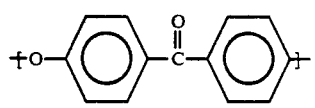   [V-I]

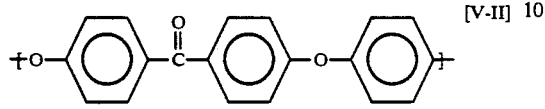   [V-II]

Examples of polymers with a repeating unit of formula V-I include ULTRAPEK ® available from BASF Corp. Examples of polymers with the repeating unit of the formula V-II include VICTREX PEEK ® available from ICI Corp.

As the aromatic polysulfone resin that can be used in the present invention, an aromatic polysulfone resin with a repeating unit of formula VI or VII is particularly suitable.

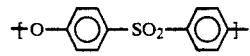   [VI]

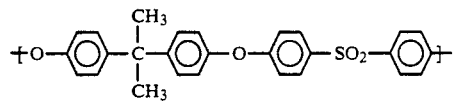   [VII]

Examples of aromatic polysulfone resins of formula VI include VICTREX PES ® available from ICI Corp., and examples of aromatic polysulfone resins of formula VII include UDED ® available from UCC Corp.

Polyarylenesulfide that can be used in the present invention includes polyphenylenesulfide, poly-4,4'-diphenylenesulfide, poly-2,4-tolylenesulfide, a copolymer synthesized by a reaction of p-dichlorobenzene and 2,4-dichlorotoluene with sodium sulfide, etc. Polyphenylenesulfide with a repeating unit of the following formula as the main component is particularly preferred:

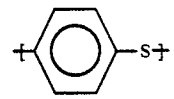

These polyphenylenesulfides include RYTON ® available from Phillips Petroleum International Inc., FORTRON ® available from Kureha Chemical Industry Co., Ltd., SUSTEEL ® available from Tosoh-Susteel Corp., TORPREN ® available from Torpren Corp., etc.

As a polyarylate that can be used in the present invention, a polymer with a repeating unit of formula VIII as the main component is preferred:

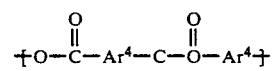   [VIII]

wherein the $Ar^4$ groups, independently, are divalent aromatic groups with at least one six-membered carbon ring. Examples of $Ar^4$ include:

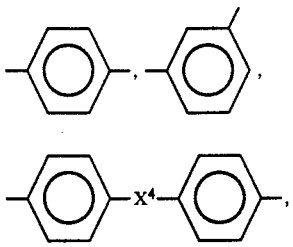

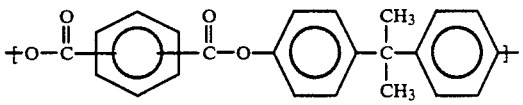

wherein $X^4$ is —O—, —S—, —CO—, —SO$_2$—, —SO—, or alkyl that contains 1 to 5 carbon atoms.

In this invention, polyarylates with a repeating unit of the following formula are particularly preferred:

The polyarylates include U Polymer ® available from Unitika Ltd., APE ® available from Bayer Corp., DUREL ® available from Hooker Corp., etc.

Examples of the aforementioned saturated polyester include a polyester which is obtained by polymerization between terephthalic acid as a component of dicarboxylic acid and a diol component and a liquid crystal polyester.

Examples of the diol component of said polyester are aliphatic glycol containing 2 to 20 carbon atoms such as ethylene glycol, 1,3-propanediol, 1,4-butanediol, 1,6-hexanediol, and 1,10-decanediol; alicyclic glycol such as 1,4-cyclohexanedimethanol; aromatic glycol such as 2,2-bis(4-hydroxyphenyl)propane; polyalkylene oxides such as polyethylene oxide, polypropylene oxide, and polytetramethylene oxide, and one of or a mixture of them is used. Polyethylene terephtalate (PET) or polybutylene terephtalate (PBT) are preferably used among these polyesters and desirable effects of the present invention are obtained when it is molded as a resin composition. Examples of commercial polyethylene terephtalates include FR-PET ® available from Teijin, Ltd. and VYLOPET ® available from Toyobo Co., Ltd. Examples of commercial polybutylene terephtalates include VALOX ® available from GE Corp., Teijin-PBT ® available from Teijin, Ltd., Toray-PBT ® available from Toray Industries Inc., etc. Lactone can be contained as another component besides polyester. Examples of lactone are ε-caprolactone, δ-valerolactone. and γ-butyrolactone.

The liquid crystal polyester can be obtained in the following way. 1) An aromatic dicarboxylic acid and an aromatic dihydroxy compound are polycondensed. 2) An aromatic hydroxycarboxylic acid is polycondensed. 3) An aromatic dicarboxylic acid, an aromatic dihydroxy compound, and an aromatic hydroxycarboxylic acid are polycondensed.

The following compounds are examples of aromatic dihydroxy compounds that can be used as a component of the above liquid crystal polyesters: resorcin, 4-acetylresorcin, hydroquinone, chlorohydroquinone, bromohydroquinone, methylhydroquinone, phenylhydroquinone (i.e., 2,5-dihydroxybiphenyl), methoxyhydroquinone, phenoxyhydroquinone, 4,4'-dihydroxybiphenyl, 3,3'-diphenyl-4,4'-dihydroxybiphenyl, 4,4'- dihydroxydiphenyl ether, 4,4'-dihydroxydiphenylsulfide, 4,4'-dihydroxydiphenylsulfone, 3,3'-diphenyl-4,4'-dihydroxydiphenylsulfone, 4,4'-dihydroxybenzophenone, 4,4'-dihydroxydiphenylmethane, Bisphenol A, 1,1-di(4-hydroxyphenyl)cyclohexane, 1,2-bis(4-hydroxyphenoxy)ethane, 1,4-dihydroxynaphthalene, 2,6-dihydroxynaphthalene, etc. Of these aromatic dihydroxy compounds, those that can be used to give liquid crystal polyesters of high crystallinity are hydroquinone, 4,4'-dihydroxybiphenyl, 4,4'-dihydroxydiphenyl ether and 4,4'-dihydroxydiphenylsulfide.

The aromatic dicarboxylic acid mentioned above includes isophthalic acid, metal salts of 5-sulfoisophthalic acid, terephthalic acid, 4,4'-biphenyldicarboxylic acid, 4,4'-dicarboxydiphenyl ether, 4,4'-dicarboxydiphenylsulfide, 4,4'-dicarboxydiphenylsulfone, 3,3'-benzophenonedicarboxylic acid, 4,4'-benzophenonedicarboxylic acid, 1,2-bis(4-carboxyphenoxy)ethane, 1,4-naphthalenedicarboxylic acid, 2,6-naphthalenedicarboxylic acid, etc. Of these aromatic dicarboxylic acids, those that can be used to give liquid crystal polyesters of high crystallinity are terephthalic acid, 4,4'-biphenyldicarboxylic acid, 4,4'-dicarboxydiphenyl ether, 4,4'-dicarboxydiphenylsulfide, 4,4'-benzophenonedicarboxylic acid, 1,2-bis(4-carboxyphenoxy)ethane, and 2,6-naphthalenedicarboxylic acid.

The aromatic hydroxycarboxylic acid mentioned above includes salicylic acid, m-hydroxybenzoic acid, p-hydroxybenzoic acid, 3-chloro-4-hydroxybenzoic acid, 3-bromo-4-hydroxybenzoic acid, 3-methyl-4-hydroxybenzoic acid, 3-phenyl-4-hydroxybenzoic acid, 3-methoxy-4-hydroxybenzoic acid, 4-hydroxy-4'-carboxybiphenyl, 2-hydroxy-6-carboxynaphthalene, etc. Of these aromatic hydroxycarboxylic acids, those that can be used to give liquid crystal polyesters of high crystallinity include p-hydroxybenzoic acid and 4-hydroxy-4'-carboxybiphenyl.

Liquid crystal polyesters that contain p-hydroxybenzoic acid are particularly suitable. The liquid crystal polyesters include EKONOL® available from Sumitomo Chemical Co., Ltd., and XYDAR® available from Dartco Corp., that have repeating units of the following formulae as the main component:

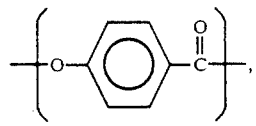

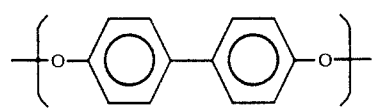

and

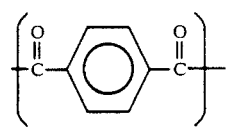

The liquid crystal polyesters also include VECTRA® available from Hoechst Celanese Corp., that has repeating units of the following formulae as the main component:

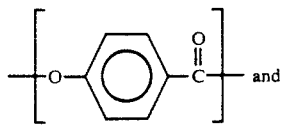

and

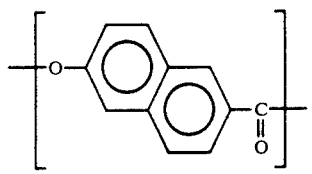

The liquid crystal polyesters further include X7G® available from Eastman Kodak Corp., NOVACCURATE® available from Mitsubishi Kasei Corp., LODRUN® available from Unitika Ltd., IDEMITSU LCP® available from Idemitsu Sekiyu Kagaku Corp., etc.; all of these liquid crystal polyesters have repeating units of the following formulae as the main component:

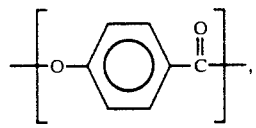

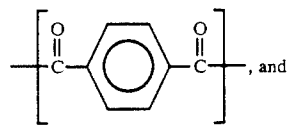, and

A polyamide-imide that can be used in the present invention is a polymer that essentially has amide linkages and imide linkages, and in particular, a polymer with a repeating unit of formula IX as the main component is preferred:

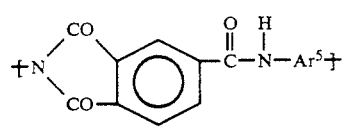 [IX]

wherein Ar⁵ is a divalent aromatic group with at least one six-membered carbon ring. Examples of Ar⁵ include

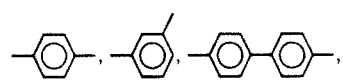

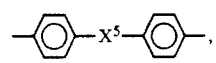

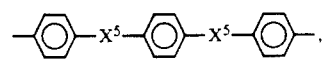

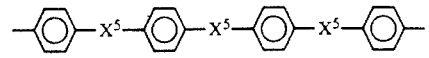

wherein $X^5$ is —O—, —S—, —CO—, $SO_2$—, —SO—, or alkylene that contains 1 to 5 carbon atoms. Examples of such a polyamide-imide includes TORLON ® available from Amoco Chemical Co., TI-5000 ® available from Toray Industries Inc., etc.

As the polycarbonate that can be used in the present invention, a polymer with a repeating unit of formula X as the main component is preferred:

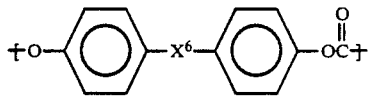

[X]

wherein $X^6$ is —O—, —S—, —CO—, —$SO_2$—, —SO—, or a divalent aliphatic group, alicyclic group, or phenyl-substituted alkylene that contains 1 to 10 carbon atoms.

In this invention, a polycarbonate with a repeating unit of the following formula as the main component is particularly suitable:

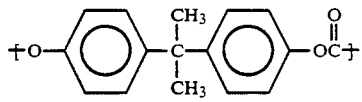

Examples of the polycarbonate include IUPILON ® available from Mitsubishi Gas Chemical Company Inc., PANLITE ® available from Teijin Kasei Corp., NOVAREX ® available from Mitsubishi Kasei Co., LEXAN ® available from GE Corp., MAKROLON ® available from Bayer Corp., etc.

As the polyphenyleneoxide that can be used in the present invention, a polymer with a repeating unit of formula XI as the main component is preferred:

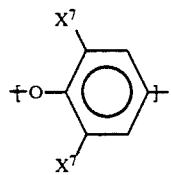

[XI]

wherein $X^7$ is alkyl that contains 1 to 4 carbon atoms, alkoxy that contains 1 to 4 carbon atoms, or halogen.

In this invention, polyphenyleneoxide with the repeating unit of the following formula as the main component is particularly preferred:

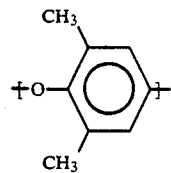

Polyphenylene oxide is not sold by itself commercially, but only as a mixture with other resins. For example, mixtures with styrene-type resins such as polystyrene, styrene-acrylonitrile copolymer, styrene-acrylonitrile-butadiene copolymer, styrene-methylmethacrylate copolymer; or with nylon are commercially available. This kind of product includes NORYL ® and NORYL GTX ® available from GE Corp., XYRON ® available from Asahi Chemical Industry Co., Ltd., etc. Generally, 20-400 parts by weight of a styrene-type resin or nylon is mixed with 100 parts by weight of the polyphenyleneoxide.

The aforementioned polyamide can be any polyamide which comprises amide-bonds with polymer main chains and can melt when heated. For example, aliphatic nylons such as 4-nylon, 6-nylon, 6.6-nylon, 11-nylon, 12-nylon, 6.10-nylon, and 6.12-nylon; and polyamides in which an aromatic monomer such as isophthalic acid, terephthalic acid, and metaxylylenediamine, an alicyclic monomer such as 2,2-bis(-paraaminocyclohexyl)propane and 4,4'-diaminodicyclohexylmethane, or a side-chain substituted aliphatic monomer such as 2,2,4- or 2,4,4-trimethylhexamethylenediamine is polycondensed.

The aforementioned polyoxymethylene is a polymer with a repeating unit of the below formula as the main component:

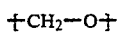

and may include 0.1 to 20% by weight of oxyalkylene component units containing 2 to 8 adjoining carbon atoms in the main chain. Examples of commercial polyoxymethylenes include DELRIN ® available from E.I. Dupont de Nemours & Co., JYERACON ® available from Polyplastics Co., Ltd., TENAC ® available from Asahi Chemical Industry Co., Ltd., etc.

The aliphatic polyester used in this invention comprises aliphatic dicarboxylic acid of formula I, aliphatic diol, and at least either of dihydroxy compound of formula II or monohydroxy compound of formula III as components.

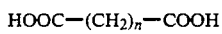

[I]

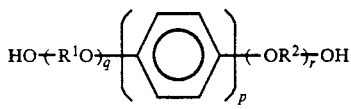

[II]

[III]

When the aliphatic dicarboxylic acid contains more than 10 carbons, the physical properties such as rubbery elasticity of the articles made of the aliphatic polyester will be worsened, so n is 0 to 10. Examples of the aforementioned dicarboxylic acids include oxalic acid, malonic acid, succinic acid, glutaric acid, adipic acid, suberic acid, or sebacic acid. These can be used alone or together in a mixture of two or more.

As the aliphatic diol mentioned above, examples include a glycol and a polyalkylene oxide. As the glycol, for example, ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, 1,10-decanediol, 1,2-cyclopentanediol, 1,2-cyclohexanediol, 1,3-cyclohexanediol, 1,4-cyclohexanediol, 1,4-cyclohexanedimethanol, etc are used. These can be used alone or together in a mixture of two or more. As the polyalkylene oxide mentioned above, polyethylene oxide, polypropylene oxide, polytetramethylene oxide, polyhexamethylene oxide, etc., are used. These can be used alone or together in a mixture of two or more. If the average molecular weight of the polyalkylene oxide is low, elasticity will not be conferred on the polyester made with it, and if it is too high, the heat stability of the polyester made with it will be low, and other physical properties will also be worsened. Thus, the preferable average molecular weight is 100–20,000, and more preferably 500–5,000.

The dihydroxy compound of formula II is a compound of low molecular weight with liquid-crystal properties, wherein alkylene $R^1$ and $R^2$ are preferably ethylene or propylene and q and r are preferably 0 or 1, respectively, for which it is preferable to use 4,4''-dihydroxy-p-terphenyl of formula A, 4,4'''-dihydroxy-p-quaterphenyl of formula B and 4,4'''-di(2-hydroxyethoxy)-p-quaterphenyl of formula C.

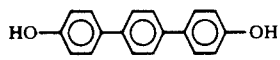
[A]

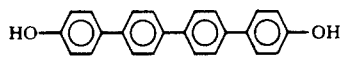
[B]

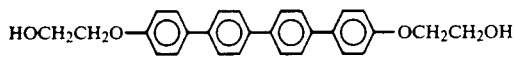
[C]

The transition temperature from a crystal to a liquid crystal for 4,4''-dihydroxy-p-terphenyl A is 260° C., this temperature for 4,4'''-dihydroxy-p-quaterphenyl B is 336° C., and this temperature for 4,4'''-di(2-hydroxyethoxy)-p-quaterphenyl C is 403° C. Here, "liquid crystal" is used to mean the state in which the compound has melted but the orientation of the molecules is still maintained. It is acceptable to use each dihydroxy compound II alone or in a mixture thereof.

When 4,4'''-dihydroxy-p-quaterphenyl B is used alone as the dihydroxy compound II, the heat stability tends to increase, but the moldability is slightly worsened. When 4,4'''-di(2-hydroxyethoxy)p-quaterphenyl C is used in combination with the 4,4'''-dihydroxy-p-quaterphenyl B, it is possible to achieve satisfactory moldability.

4,4'''-Dihydroxy-p-quaterphenyl B is prepared in any of the known methods, for example, a method described in the Journal of the Chemical Society, 1379–85 (1940), and another method in which 4-hydroxy-4'-bromobiphenyl is heated to react under pressure in the presence of alkali with use of a palladium catalyst, resulting in a sodium salt of 4,4'''-dihydroxy-p-quaterphenyl, and then acid is added to precipitate 4,4'''-dihydroxy-p-quaterphenyl. It is possible to obtain 4,4'''-di(2-hydroxyethoxy)-p-quaterphenyl C by the addition of ethylene oxide to 4,4'''-dihydroxy-p-quaterphenyl. 4,4'''-Diacetoxy-p-quaterphenyl and 4,4'''-di(2-acetoxyethoxy)-p-quaterphenyl obtained by the acetylation of 4,4'''-dihydroxy-p-quaterphenyl B and 4,4'''-di(2-hydroxyethoxy)-p-quaterphenyl C, respectively, can be used for the preparation of the polyester instead of the 4,4'''-dihydroxy-p-quaterphenyl B and the 4,4'''-di(2-hydroxyethoxy)-p-quaterphenyl C, respectively.

In general, the crystallinity of the molecules of liquid crystals is high, and as described before, the transition temperature of 4,4''-dihydroxy-p-terphenyl A, 4,4'''-dihydroxy-p-quaterphenyl B and 4,4'''-di(2-hydroxyethoxy)-p-quaterphenyl C from a crystal to a liquid crystal is high, so when these dihydroxy compounds II are incorporated into a polymer chain, the polymer obtained has specific properties, as follows.

For example, if dihydroxy compound II and a compound that has a soft segment are used as the main monomer components of the polyester, a polyester that has the properties of a thermoplastic elastomer, with excellent heat stability, is obtained. The reason for this phenomenon is as follows. Because this polyester has soft segments and hard segments, the hard-segment portions of the chains of the polyester molecules come to be cross-linked physically, as mentioned above. At this time, because the crystallinity of the dihydroxy compound II is high, the cross-linking is strong; also, the dihydroxy compound has a high liquid-crystal transition temperature, so the heat stability of the polyester obtained is excellent. These effects can be achieved even when only a small amount of dihydroxy compound is used. Also, because the polyester molecules contain soft segments, the polyester has the characteristics of a thermoplastic elastomer, with elasticity that originates from the soft segments.

In the monohydroxy compound of the aforementioned formula III, $R^3$ is preferably ethylene or propylene, m is preferably 0 or 1, and l is preferably 2 or 3. As the aforementioned monohydroxy compound, it is preferable to use 4-hydroxy-p-terphenyl, 4-hydroxy-p-quaterphenyl, 4-(2-hydroxyethoxy)-p-terphenyl and 4-(2-hydroxyethoxy)-p-quaterphenyl. It is acceptable to use each monohydroxy compound II alone or in a mixture thereof.

A monohydroxy compound of the aforementioned formula III is a compound with low molecular weight which has a rod like a structure comprising a paraphenylene skeleton. The melting points of these compounds are very high because of their molecular structure. Furthermore, it is known that the paraphenylene skeleton is effective as a mesogen of low molecular weight with liquid-crystal properties, which means that said skeleton has a strong agglutinability not only in a solid state but also in a state of a high temperature (melted state). Therefore, when the aforementioned monohydroxy compound III is incorporated into a polymer chain, very strong physical cross-linking with high heat stability is caused, thereby forming a thermoplastic elastomer with excellent heat stability.

It is acceptable to include polysilicone with two hydroxyl groups, lactone, and/or an aromatic hydroxycarboxylic acid, as monomer compounds, in an aliphatic polyester made from the aforementioned aliphatic dicarboxylic acid I, aliphatic diol and at least either of dihydroxy compound II and monohydroxy compound III.

The polysilicone is an organopolysiloxane having two hydroxyl groups, and a polysilicone with two hydroxyl groups at the termini of the molecule is preferable. Examples of the polysilicone include dimethylpolysiloxane, diethylpolysiloxane, diphenylpolysiloxane, etc., with two hydroxyl groups at the termini of the molecule. If the average molecular weight of the polysilicone is low, elasticity will not be conferred on the polyester made with it, and if it is too high, the polycondensation of a polyester from it will be difficult. Thus, the preferable average molecular weight is 100–20,000, and more preferably 500–5,000.

The lactone reacts with a monomer that contains a carboxyl group and/or hydroxyl group in a ring-opening reaction, resulting in an aliphatic portion in the polyester chain. When lactone is used, the polyester becomes more elastic. As the lactone, lactones with four or more carbon atoms in their ring are preferable, and those with five to eight carbon atoms in the ring are more preferable. Examples of the lactone include ε-caprolactone, δ-valerolactone, γ-butyrolactone, and the like.

The amount of lactone to be used can be decided as the amount appropriate to give a polyester with the desired properties. If the amount of lactone used is large, the molecular weight of the polyester will not be high, and there is a tendency for the elasticity of the polyester to decrease, so it is preferable to use 90 mol % or less based on the total amount of monomer of the polyester, and more preferably 75 mol % or less.

The aromatic hydroxycarboxylic acid is a component that confers rigidity and liquid-crystal properties on the polyester. Examples of the hydroxycarboxylic acid include salicylic acid, m-hydroxybenzoic acid, p-hydroxybenzoic acid, 3-chloro-4-hydroxybenzoic acid, 3-bromo-4-hydroxybenzoic acid, 3-methoxy-4-hydroxybenzoic acid, 3-methyl-4-hydroxybenzoic acid, 3-phenyl-4-hydroxybenzoic acid, 2-hydroxy-6-naphthoic acid, 4-hydroxy-4'-carboxybiphenyl, etc. In particular, p-hydroxybenzoic acid, 2-hydroxy-6-naphthoic acid, and 4-hydroxy-4'-carboxybiphenyl are preferable.

The amount of the aromatic hydroxycarboxylic acid to be used can be decided as the amount appropriate to give an aliphatic polyester with the desired properties. If the amount of the aromatic hydroxycarboxylic acid used is large, the rigidity of the polyester increases, and elasticity decreases, so that it is not suitable for use as a thermoplastic elastomer. Thus, it is preferable to use 30 mol % or less based on the total amount of monomer of the aliphatic polyester, and the total amount of the dihydroxy compound II and the aromatic hydroxycarboxylic acid is preferably in the range of from 0.1–30 mol % based on the total amount of monomer of the aliphatic polyester.

In order to improve the mechanical and other properties of a polyester, an aromatic diol other than dihydroxy compound II and monohydroxy compound III, and/or an aromatic dicarboxylic acid may be included as components in the aliphatic polyester mentioned above.

Examples of the aromatic diol include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenyl ether, 4,4'-dihydroxydiphenylsulfone, 4,4'-dihydroxydiphenylsulfide, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, 2,6-dihydroxynaphthalene, and the like.

Examples of the aromatic dicarboxylic acid mentioned above include terephthalic acid, isophthalic acid, metal salts of 5-sulfoisophthalic acid, 4,4'-biphenyldicarboxylic acid, 4,4'-dicarboxydiphenyl ether, 4,4'-dicarboxydiphenyl sulfone, 3,3'-benzophenonedicarboxylic acid, 4,4'-benzophenonedicarboxylic acid, 1,2-bis(4-carboxyphenoxy)ethane, 1,4-naphthalenedicarboxylic acid, 2,6-naphthalenedicarboxylic acid, and the like.

If a large amount of an aromatic diol other than dihydroxy compound II and monohydroxy compound III or an aromatic dicarboxylic acid is added, the polyester will lose elasticity, and properties of an aliphatic polyester. Therefore, the amount of the aromatic diol other than dihydroxy compound II and monohydroxy compound III, and/or the aromatic dicarboxylic acid in the polyester is preferably 30 mol % or less, and more preferably, 25 mol % or less based on the total moles of monomer components of the polyester; and the combined amount of the dihydroxy compound II and monohydroxy compound III and the aromatic diol and/or aromatic dicarboxylic acid is preferably in the range of from 0.2 to 40 mol %, and more preferably 0.5 to 30 mol %, based on the total moles of monomer components of the polyester.

If the amount of the dihydroxy compound II in the aliphatic polyester made from the dihydroxy compound II and aliphatic diol is small, the heat stability decreases and if the amount is large, the elasticity of the polyester decreases, therefore it will not be suitable for a thermoplastic elastomer. Therefore, the amount of the dihydroxy compound II in the polyester is preferably 0.1 to 30 mol %, more preferably, 0.5 to 20 mol %, and most preferably, 1.0 to 10 mol % based on the total amount of monomer of the polyester. In this case, polyalkylene oxide or polysilicone is used as a diol other than an aromatic, a unit structure is counted as 1 monomer unit. That is, polyethylene oxide having polymerization degree of 10 is counted as 10 monomer units.

If the amount of monohydroxy compound III used in the aliphatic polyester made from the aforementioned monohydroxy compound III, aliphatic diol and aliphatic dicarboxylic acid is small, the heat stability decreases. If the amount used is large, the molecular weight of the aliphatic polyester will not be high, thereby deteriorating the physical properties. Thus, the amount used is preferably 0.1–20 mol % based on the total amount of monomer of the aliphatic polyester.

If the total amount of the hydroxy compound of dihydroxy compound II and monohydroxy compound III in the aliphatic polyester made from the dihydroxy compound II, monohydroxy compound III, aliphatic diol and aliphatic dicarboxylic acid is small, the heat stability decreases and if the amount is large, the elasticity of the polyester decreases and the molecular weight of the aliphatic polyester will not be high. Therefore, the amount is preferably 0.1 to 30 mol % based on the total amount of monomer of the polyester. The ratio of dihydroxy compound II and monohydroxy compound III is preferably in the range of:

$$0 < III/(II+III) < \tfrac{2}{3}$$

The aliphatic polyester of this invention made from the aforementioned components can be prepared by any of the following well-known methods for polycondensation.

1. A direct reaction between dicarboxylic acid and diol (including aliphatic diol, dihydroxy compound, monohydroxy compound, etc.).
2. A transesterification reaction between a lower alkyl ester of dicarboxylic acid and diol.
3. A reaction between halogenated dicarboxylic acid and diol in an appropriate solvent of pyridine or the like.
4. A reaction between an alcholate of diol and a halogenated dicarboxylic acid.
5. A transesterification reaction between an acetylated diol and a dicarboxylic acid.

When the polycondensation mentioned above is carried out, catalysts that are generally used in the preparation of polyesters can be used. Examples of such catalysts include metals such as lithum, sodium, potassium, cesium, magnesium, calcium, barium, strontium, zinc, aluminium, titanium, cobalt, germanium, tin, lead, antimony, arsenic, cerium, boron, cadmium, manganese, and the like; metal oxides thereof; and organometallic compounds containing these metals such as salts of organic acids and metal alkoxides.

Among such catalysts, especially preferred are calcium acetate, diacyltin, tetraacyltin, dibutyltin oxide, dibutyltin dilaurate, dimethyltin maleate, dioctyltin, tetraacetyltin, triisobutylaluminium, tetrabutyl titanate, germanium dioxide, and antimony trioxide. It is also possible to use a mixture of two or more of these catalysts. In order to remove efficiently by-products arising from polycondensation such as water, alcohols, glycols, and the like, and to obtain a polyester of high molecular weight, it is preferable to reduce the pressure of the reaction system to 1 mm Hg or less at the late stage of the polycondensation. In general, the reaction temperature is 150° C.–350° C.

The polyester can take on various structures by changes in order of the addition of the dihydroxy compound II at the time of polycondensation. For example, when dihydroxy compound II is added together with the dicarboxylic acid and the other diol component, a random copolymer is readily obtained. When the dihydroxy compound II is added at a late stage of the polycondensation, a block copolymer is readily obtained. Furthermore, when the above-mentioned dihydroxy compound II or an acetylated dihydroxy compound is added to an already prepared polyester and mixed by being kneaded under reduced pressure with heat, it is possible to introduce segments derived from the dihydroxy compound II into the chain of the polyester molecules by reaction with elimination of ethylene glycol or by transesterification.

An engineering plastic composition according to this invention can be prepared by the commonly known methods. For example, there is a method in which the engineering plastic material and the aliphatic polyester are melted and mixed together. In order to mix the engineering plastic material and the aliphatic polyester uniformly, methods for melting and kneading by the use of an extruder, kneader, Banbury mixer, roll, or the like are particularly preferred.

The mixing ratio of the above engineering plastic material and the above aliphatic polyester can be determined in a wide range according to the objectives. For example, in order to obtain an engineering plastic composition with excellent moldability and impact strength, the mixing ratio of the above aliphatic polyester is preferably in the range of 1 to 50% by weight, more preferably 3 to 40% by weight. If the amount added exceeds 50% by weight, the mechanical strength are worsened and the performance as the engineering plastic material is not sufficient. If the amount added is less than 1% by weight, an engineering plastic material with excellent moldability and impact strength cannot be obtained.

Particularly, in a polyetherimide composition, in order to obtain an engineering plastic composition with excellent moldability and impact strength, the mixing ratio of said aliphatic polyester is preferably in the range of 3 to 30% by weight, more preferably 5 to 25% by weight. If the amount added exceeds 30% by weight, the heat stability and mechanical strength are worsened and the performance as an engineering plastic material is not sufficient. If the amount added is less than 3% by weight, the moldability is worsened.

Furthermore, in a polyamide-imide composition, in order to obtain an engineering plastic composition with excellent moldability and impact strength, the mixing ratio of said aliphatic polyester is preferably in the range of 1 to 25% by weight, more preferably 3 to 20% by weight. If the amount added exceeds 25% by weight, the heat stability and mechanical strength are worsened and the performance as an engineering plastic material is not sufficient. If the amount added is less than 1% by weight, the moldability is worsened.

In addition, in order to obtain an engineering plastic composition with excellent heat stability and rubber-like elasticity, the mixing ratio of the aforementioned polyester is in the range of 50 to 99% by weight, more preferably in the range of 60 to 95% by weight. If the amount added is less than 50% by weight, the rubber-like elasticity decreases and if the amount added exceeds 99% by weight, the heat stability of the aliphatic polyester is not improved.

In the engineering plastic composition of this invention, it is possible to include reinforcing fibers for the purposes such as increasing the heat stability and improving the mechanical properties, provided that the composition is suitable for practical use. Per 100 parts by weight of said composition, reinforcing fibers can be added at the proportion of 1.0–400 parts by weight, and preferably at the proportion of 5–200 parts by weight. If the proportion of the reinforcing fibers is less than 1.0 part by weight per 100 parts by weight of said composition, the additive effect by which the mechanical strength of said composition is increased is small. If the proportion of the reinforcing fibers exceeds 400 parts by weight per 100 parts by weight of said composition, the melt viscosity of the mixture becomes higher, and the moldability of the mixture is poor. Generally, the impact strength is worsened when reinforcing fibers are contained, but this problem can be avoided because of the presence of aliphatic polyester components.

As reinforcing fibers, inorganic fibers such as glass fibers, carbon fibers, boron fibers, silicon carbide fibers, graphite fibers, alumina fibers, amorphous-metal fibers, silicon-titanium-carbon fibers, and organic fibers such as aramide fibers, can be used for preference. In particular, glass fibers with a diameter of 1–50 $\mu$m and the length of 0.1 mm to 5 cm that are used to reinforced plastics are suitable for use.

In the engineering plastic composition of this invention, it is possible to further include the following additives, provided that the composition is suitable for practical use. That is, inorganic fillers such as calcium carbonate, titanium oxide, mica, and talc; heat stabilizers such as triphenylphosphite, trilaurylphosphite, trisnonylphenylphosphite, and 2-tert-butyl-$\alpha$-(3-tert-butyl-4-hydroxyphenyl)-p-cumenylbis(p-nonylphenyl)-phosphite; flame retardants such as hexabromocyclododecane, tris-(2,3-dichloropropyl) phosphate, and pentabromophenyl arylether; UV absorbers such as p-tert-butylphenyl salicylate, 2-hydroxy-4-methoxybenzophenone, 2-hydroxy-4-methoxy-2'-carboxybenzophenone, and 2,4,5-trihydroxybutyrophenone; antioxidants such as butylhydroxyanisol, butylhydroxytoluene, distearyl thiodipropionate, dilauryl thiodipropionate, and hindered phenol antioxidants; antistatic agents such as N,N-bis(hydroxyethyl)alkylamine, alkylarylsulfonate, and alkylsulfonate; inorganic substrates such as barium sulfate, alumina, and silicon oxide; salts of higher fatty acids such as sodium stearate, barium stearate, and sodium palmitate; organic substances such as benzyl alcohol and benzophenone; and agents to accelerate crystallization such as highly crystallized polyethylene terephthalate and highly crystallized poly-trans-cyclohexanedimethanol terephthalate.

The engineering plastic composition thus obtained can be formed into articles of the desired shape by compression molding, extrusion molding, injection molding, blow molding, and the like. Articles can be used for mechanical parts, electronic parts, films, pipes, and the like.

EXAMPLES

Below, this invention will be explained with reference to examples.

The properties of the engineering plastic compositions obtained in the following examples and comparative examples were evaluated by the following methods.

Measurement of physical properties (A) Melt viscosity

The average of the results of tests measured three times by the method of JIS K 7210 (flowability test; auxiliary test) with a Koka-type flow tester, was calculated. The measurements were done with a plunger with the cross-sectional area of 1 cm$^2$, a die that was 10 mm long with a 1 mm diameter, and a load of 100 kg. The temperature used is given in the corresponding tables of examples.

(B) Izod impact strength

A test sample with a notch was prepared and the average of the results of tests measured 10 times by the method of JIS K-7110 at room temperature (23° C.) was calculated.

(C) Tensile strength

The average of the results of tests measured 5 times by the method of JIS K-6301 at a room temperature of 23° C. was calculated. A No. 3 dumbbell was used as a sample.

(D) Deflection temperature

The average of the results of tests measured 5 times with a load of 18.6 kg/cm$^2$ by the method of JIS K-7207 at a room temperature of 23° C. was calculated using a sample 6.4 mm in thickness, 12.6 mm in width, and 130 mm in length.

(E) Surface hardness

The surface hardness was measured by the method of ASTM D-2240, using a D-type durometer.

(F) Vicat softening temperature

A test sample of 3 mm thick was prepared and measured by the method of JIS K-7206 with a load of 1 kg.

Synthesis of aliphatic polyester (A) Aliphatic polyester A

Into a 1-liter glass flask equipped with a stirrer, thermometer, gas inlet, and distillation outlet were added 87.1 g (0.50 moles) of dimethyl adipate, 74.4 g (1.20 moles) of ethylene glycol, and small amounts of calcium acetate and antimony trioxide as catalysts. The mixture in the flask was purged with nitrogen, heated to 180° C. and reacted at this temperature for 2 hours. Bis(2-hydroxyethyl)adipate (BHEA) was produced by the removal of methanol from the flask by distillation.

To the reaction mixture in the flask obtained above, 4,4'''-dihydroxy-p-quaterphenyl (DHQ) was added at the molar ratio of 10% to BHEA. The mixture was heated to 320° C. and reacted for about 30 minutes. Then, after the distillation outlet was connected to a vacuum device, the mixture was reacted at 300° C. for 2 hours under a reduced pressure of 1 mm Hg. As the reaction proceeded, a highly viscous liquid was formed by removal of ethylene glycol from the flask.

The limiting viscosity [η] of the aliphatic polyester (A) thus obtained was 1.15 (30° C., orthochlorophenol solvent).

(B) Aliphatic polyester B

To the BHEA in the flask obtained in the same manner as is in (A), DHQ was added at the molar ratio of 10% to BHEA. The mixture was heated to 320° C. and reacted for about 30 minutes. Then, after the distillation outlet was connected to a vacuum device, the mixture was reacted at 300° C. for 2.5 hours under a reduced pressure of 1 mm Hg. As the reaction proceeded, a highly viscous liquid was formed by removal of ethylene glycol from the flask.

The limiting viscosity [η] of the aliphatic polyester (B) thus obtained was 1.35 (30° C., orthochlorophenol solvent).

(C) Aliphatic polyester C

To the BHEA in the flask obtained in the same manner as is in (A), 4,4''-dilydroxy-p-terphenyl (DHT) was added at the molar ratio of 10% to BHEA. The mixture was heated to 280° C. and reacted for about 1 hour. Then, after the distillation outlet was connected to a vacuum device, the mixture was reacted at this temperature for 2 hours under a reduced pressure of 1 mm Hg. As the reaction proceeded, a highly viscous liquid was formed by removal of ethylene glycol from the flask.

The limiting viscosity [η] of the aliphatic polyester (C) thus obtained was 1.10 (30° C., orthochlorophenol solvent).

(D) Aliphatic polyester D

To the BHEA in the flask obtained in the same manner as is in (A), 4-hydroxy-p-terphenyl (HT) and DHT were added at the molar ratio of 5%, respectively, to BHEA. The mixture was heated to 280° C. and reacted for about 1 hour. Then, after the distillation outlet was connected to a vacuum device, the mixture was reacted at this temperature for 2 hours under a reduced presviscous liquid was formed by removal of ethylene glycol from the flask.

The limiting viscosity [η] of the aliphatic polyester (D) thus obtained was 1.05 (30° C., orthochlorophenol solvent).

(E) Aliphatic polyester E

To the BHEA in the flask obtained in the same manner as is in (A), 4-hydroxy-p-quaterphenyl (HQ) and DHQ were added at the molar ratio of 5%, respectively, to BHEA. The mixture was heated to 320° C. and reacted for about 30 minutes. Then, after the distillation outlet was connected to a vacuum device, the mixture was reacted at 300° C. for 2.5 hours under a reduced pressure of 1 mm Hg. As the reaction proceeded, a highly viscous liquid was formed by removal of ethylene glycol from the flask.

The limiting viscosity [η] of the aliphatic polyester (E) thus obtained was 1.27 (30° C., orthochlorophenol solvent).

(F) Aliphatic polyester F

Into a 1-liter glass flask equipped with a stirrer, thermometer, gas inlet, and distillation outlet were added 101 g (0.50 moles) of dimethyl sebacate, 74.4 g (1.20 moles) of ethylene glycol, and small amounts of calcium acetate and antimony trioxide as catalysts. The mixture in the flask was purged with nitrogen, heated to 180° C. and reacted at this temperature for 2 hours. Bis(2-hydroxyethyl)sebacate (BHES) was produced by the removal of methanol from the flask by distillation.

To the reaction mixture in the flask obtained above, 4,4'''-di(2-hydroxyethoxy)-p-quarterphenyl (DHEQ) was added at the molar ratio of 10% to BHES. The mixture was heated to 320° C. and reacted for about 30 minutes. Then, after the distillation outlet was connected to a vacuum device, the mixture was reacted at 300° C. for 2 hours under a reduced pressure of 1 mm Hg. As the reaction proceeded, a highly viscous liquid was formed by removal of ethylene glycol from the flask.

The limiting viscosity [η] of the aliphatic polyester (F) thus obtained was 1.20 (30° C., orthochlorophenol solvent).

EXAMPLES 1-3 AND COMPARATIVE EXAMPLE 1

Polyamide-imide (Amoco Chemical Co., TORLON ®4203L) and the aliphatic polyester (A) were dryblended in the weight ratio as shown in Table 1, and then melted and mixed with in a plastograph at 340°-350° C. for 5 minutes, resulting in a polyamide-imide resin composition. The melt viscosity of this resin composition was measured at 330° C. This resin composition was injection-molded at 340° C. at the pressure of 2200 kg/cm², the temperature of the mold being at 200° C., and the sheet so obtained was heat-treated at 165° C. for 24 hours, at 245° C. for 24 hours, and at 260° C. for 48 hours. Next, a sample of 3.2 mm thick for the Izod impact strength test and a No. 3 dumbbell of 2.0 mm thick were produced. The impact strength and the tensile strength were measured, using the test sample and the dumbbell thus obtained, respectively. The results are shown in Table 1.

EXAMPLES 4-7 AND COMPARATIVE EXAMPLE 2

Polyetherimide (GE Corp., ULTEM® 1000) and the aliphatic polyester (A) were dryblended in the weight ratio as shown in Table 2, and then melted and mixed with in a plastograph at 360° C. for 3 minutes, resulting in a polyetherimide resin composition. The melt viscosity of the polyetherimide resin composition was measured at 340° C. A sample of 3.2 mm thick for the Izod impact strength test, a No. 3 dumbbell of 2.0 mm thick and a sample of 6.4 mm thick for the deflection temperature test were obtained by compression-molding of this resin composition at 340° C. The impact strength, the tensile strength and the deflection temperature were measured using the test samples and the dumbbell thus obtained, respectively. The results are shown in Table 2.

EXAMPLES 8-11 AND COMPARATIVE EXAMPLE 3

Polyetheretherketone (ICI Corp., VICTEREX PEEK® 450G) and the aliphatic polyester (A) were dry-blended in the weight ratio as shown in Table 3, and then melted and mixed with in a plastograph at 380° C. for 3 minutes, resulting in a polyetheretherketone resin composition. The melt viscosity of this resin composition was measured at 380° C. A sample 3.2 mm thick for the Izod impact strength test was obtained by compression-molding of this resin composition. The impact strength was measured and the results are shown in Table 3.

EXAMPLES 12-14 AND COMPARATIVE EXAMPLE 4

Polyethersulfone (ICI Corp., VICTEREX PES® 4800G) and the aliphatic polyester (A) were dryblended in the weight ratio as shown in Table 4, and then melted and mixed with in a plastograph at 360° C. for 3 minutes, resulting in a polyethersulfone resin composition. The melt viscosity of this resin composition was measured at 350° C. A sample of 3.2 mm thick for the Izod impact strength test and a sample of 6.4 mm thick for the deflection temperature test were obtained by compression-molding of this resin composition at 360° C. The impact strength and the deflection temperature was measured. The results are shown in Table 4.

EXAMPLES 15-17 AND COMPARATIVE EXAMPLE 5

Liquid crystal polyester (Unitika Ltd., LODRUN® LC-3000) and the aliphatic polyester (A) were dry-blended in the weight ratio as shown in Table 5, and then melted and mixed with in a plastograph at 260° C. for 5 minutes, resulting in a liquid crystal polyester resin composition. The melt viscosity of this resin composition was measured at 240° C. A sample 3.2 mm thick for the Izod impact strength test was obtained by compression-molding of this resin composition at 240° C. and the impact strength was measured. The results are shown in Table 5.

TABLE 1

|  | Example 1 | Example 2 | Example 3 | Comparative Example 1 |
|---|---|---|---|---|
| Composition (Parts by weight) |  |  |  |  |
| Polyamideimide | 90 | 80 | 60 | 100 |
| Aliphatic Polyester (A) | 10 | 20 | 40 | 0 |
| Melt Viscosity (poise) × 10⁴ | 6.7 | 5.0 | 3.8 | 10.4 |
| Izod Impact Strength (notch, kg · cm/cm²) | 18 | 23 | 30 | 13 |
| Tensile Strength (kg/cm²) | 1820 | 1790 | 1620 | 1850 |

TABLE 2

|  | Example 4 | Example 5 | Example 6 | Example 7 | Comparative Example 2 |
|---|---|---|---|---|---|
| Composition (Parts by weight) |  |  |  |  |  |
| Polyetherimide | 95 | 90 | 80 | 60 | 100 |
| Aliphatic Polyester (A) | 5 | 10 | 20 | 40 | 0 |
| Melt Viscosity (poise) × 10³ | 8.2 | 7.5 | 6.3 | 3.0 | 12.0 |
| Izod Impact Strength (notch, kg · cm/cm²) | 8 | 10 | 13 | 22 | 5 |
| Tensile Strength (kg/cm²) | 1070 | 1040 | 1000 | 860 | 1080 |
| Deflection temperature (°C.) | 198 | 196 | 195 | 180 | 200 |

TABLE 3

|  | Example 8 | Example 9 | Example 10 | Example 11 | Comparative Example 3 |
|---|---|---|---|---|---|
| Composition (Parts by weight) | | | | | |
| Polyetheretherketone | 90 | 80 | 75 | 60 | 100 |
| Aliphatic Polyester (A) | 10 | 20 | 25 | 40 | 0 |
| Melt Viscosity (poise) × $10^2$ | 13 | 10 | 5.2 | 2.2 | 23 |
| Izod Impact Strength (notch, kg·cm/cm$^2$) | 15 | 18 | 25 | 25 | 9 |

TABLE 4

|  | Example 12 | Example 13 | Example 14 | Comparative Example 4 |
|---|---|---|---|---|
| Composition (Parts by weight) | | | | |
| Polyethersulfone | 95 | 90 | 80 | 100 |
| Aliphatic Polyester (A) | 5 | 10 | 20 | 0 |
| Melt Viscosity (poise) × $10^2$ | 30 | 9.5 | 3.0 | 63 |
| Izod Impact Strength (notch, kg·cm/cm$^2$) | 12.5 | 18.0 | 25.6 | 8.0 |
| Deflection temperature (°C.) | 198 | 195 | 193 | 201 |

TABLE 5

|  | Example 15 | Example 16 | Example 17 | Comparative Example 5 |
|---|---|---|---|---|
| Composition (Parts by weight) | | | | |
| Liquid crystal polyester | 90 | 80 | 60 | 100 |
| Aliphatic Polyester (A) | 10 | 20 | 40 | 0 |
| Melt Viscosity (poise) × $10^3$ | 2.3 | 1.8 | 1.5 | 4.1 |
| Izod Impact Strength (notch, kg·cm/cm$^2$) | 55 | 61 | 66 | 40 |

EXAMPLES 18-20 AND COMPARATIVE EXAMPLE 6

Polyarylate (Unitika Ltd., U polymer ® U-8000) and the aliphatic polyester (A) were dryblended in the weight ratio as shown in Table 6, and then melted and mixed with in a plastograph at 280° C. for 5 minutes, resulting in a polyarylate resin composition. The melt viscosity of this resin composition was measured at 260° C. A sample of 3.2 mm thick for the Izod impact strength test and a No. 3 dumbbell of 2.0 mm thick were obtained by compression-molding of this resin composition at 290° C. and the impact strength of the test sample and the tensile strength of the dumbbell thus obtained were measured, respectively. The results are shown in Table 6.

EXAMPLES 21-23 and Comparative Example 7

Glass-fiber reinforced polyarylate (Unitika Ltd., U polymer ® U-8000-30; 30% by weight glass fibers, with glass fibers 20 μm diameter and 0.2-1.0 mm long) and the aliphatic polyester (A) were dryblended in the weight ratio as shown in Table 7, and then melted and mixed with in a plastograph at 280° C. for 5 minutes, resulting in a polyarylate resin composition. The melt viscosity of this resin composition was measured at 280° C. A sample of 3.2 mm thick for the Izod impact strength test and a No. 3 dumbbell of 2.0 mm thick were obtained by compression-molding of this resin composition at 300° C. and the impact strength of the test sample and the strength of the dumbbell thus obtained were measured, respectively. The results are shown in Table 7.

EXAMPLES 24-26 AND COMPARATIVE EXAMPLE 8

Glass-fiber reinforced polyamide (Asahi Kasei Co., REONA ® 1300G; 33% by weight glass fibers, with glass fibers 20 μm diameter and 0.2-1.0 mm long) and the aliphatic polyester (A) was dryblended in the weight ratio as shown in Table 8, and then melted and mixed with in a plastograph at 260° C. for 5 minutes, resulting in a reinforced polyamide resin composition. The melt viscosity of this resin composition was measured at 260° C. A sample 3.2 mm thick for the Izod impact strength test was obtained by compression-molding of this resin composition at 280° C. and the impact strength of the test sample thus obtained was measured. The results are shown in Table 8.

EXAMPLES 27-29 AND COMPARATIVE EXAMPLE 9

Glass-fiber reinforced polyphenylenesulfide (Phillips Petroleum International Inc., RYTON ® R-4; 40% by weight glass fibers, with glass fibers 20 μm diameter and 0.2-1.0 mm long) and the aliphatic polyester (A) were dryblended in the weight ratio as shown in Table 9, and then melted and mixed with in a plastograph at 300° C. for 5 minutes, resulting in a reinforced polyphenylenesulfide resin composition. The melt viscosity of this resin composition was measured at 300° C. A sample 3.2 mm thick for the Izod impact strength test was obtained by compression-molding of this resin composition at 310° C. and the impact strength of the test sample thus obtained was measured. The results are shown in Table 9.

EXAMPLES 30-32 AND COMPARATIVE EXAMPLE 10

Polybutylene terephthalate (Teijin Ltd., TEIJIN PBT ®-C7000) and the aliphatic polyester (A) were dryblended in the weight ratio as shown in Table 10, and then melted and mixed with in a plastograph at 240° C. for 5 minutes, resulting in a polybutylene terephthalate resin composition. The melt viscosity of this resin composition was measured at 230° C. A sample 3.2 mm thick for the Izod impact strength test was obtained by compression-molding of this resin composition at 260° C. and the impact strength of the test sample thus obtained was measured. The results are shown in Table 10.

EXAMPLES 33-35 AND COMPARATIVE EXAMPLE 11

Glass-fiber reinforced polybutylene terephthalate (Teijin Ltd., TEIJIN, PBT ®-C7030; 30% by weight glass fibers, with glass fibers 20 μm diameter and 0.2-1.0 mm long) and the aliphatic polyester (A) were dryblended in the weight ratio as shown in Table 11, and then melted and mixed with in a plastograph at 250° C. for 5 minutes, resulting in a reinforced polybutylene terephthalate resin composition. The melt viscosity of this resin composition was measured at 230° C. A sample 3.2 mm thick for the Izod impact strength test was obtained by compression-molding of this resin composition at 270° C. and the impact strength of the test sample thus obtained was measured. The results are shown in Table 11.

EXAMPLES 36–38 AND COMPARATIVE EXAMPLE 12

Glass-fiber reinforced polyethylene terephthalate (Teijin Ltd, FR-PET®C3030; 30% by weight glass fibers, with glass fibers 20 μm diameter and 0.2–1.0 mm long) and the aliphatic polyester 9A) were dryblended in the weight ratio as shown in Table 12, and then melted and mixed with in a plastograph at 260° C. for 5 minutes, resulting in a reinforced polyethylene terephthalate resin composition. The melt viscosity of this resin composition was measured at 260° C. A sample 3.2 mm thick for the Izod impact strength test was obtained by compression-molding of this resin composition at 270° C. and the impact strength of the test sample thus obtained was measured. The results are shown in Table 12.

TABLE 6

| | Example 18 | Example 19 | Example 20 | Comparative Example 6 |
|---|---|---|---|---|
| Composition (Parts by weight) | | | | |
| Polyarylate | 90 | 80 | 60 | 100 |
| Aliphatic Polyester (A) | 10 | 20 | 40 | 0 |
| Melt Viscosity (260° C.) (poise) × 10$^4$ | 4.9 | 3.6 | 2.4 | 7.6 |
| Izod Impact Strength (notch, kg · cm/cm$^2$) | 17 | 23 | 31 | 11 |
| Tensile Strength (kg/cm$^2$) | 760 | 710 | 680 | 790 |

TABLE 7

| | Example 21 | Example 22 | Example 23 | Comparative Example 7 |
|---|---|---|---|---|
| Composition (Parts by weight) | | | | |
| Glass-fiber reinforced polyarylate | 90 | 80 | 60 | 100 |
| Aliphatic Polyester (A) | 10 | 20 | 40 | 0 |
| Melt Viscosity (280° C.) (poise) × 10$^3$ | 5.9 | 4.2 | 2.9 | 9.8 |
| Izod Impact Strength (notch, kg · cm/cm$^2$) | 16 | 22 | 32 | 10 |
| Tensile Strength (kg/cm$^2$) | 1150 | 1110 | 1090 | 1180 |

TABLE 8

| | Example 24 | Example 25 | Example 26 | Comparative Example 8 |
|---|---|---|---|---|
| Composition (Parts by weight) | | | | |
| Glass-fiber reinforced polyamide | 90 | 80 | 60 | 100 |
| Aliphatic Polyester (A) | 10 | 20 | 40 | 0 |
| Melt Viscosity (260° C.) (poise) × 10$^4$ | 5.6 | 4.0 | 2.9 | 8.4 |
| Izod Impact Strength (notch, kg · cm/cm$^2$) | 20 | 25 | 29 | 13 |

TABLE 9

| | Example 27 | Example 28 | Example 29 | Comparative Example 9 |
|---|---|---|---|---|
| Composition (Parts by weight) | | | | |
| Glass-fiber reinforced polyphenylene sulfide | 90 | 80 | 60 | 100 |
| Aliphatic Polyester (A) | 10 | 20 | 40 | 0 |
| Melt Viscosity (300° C.) (poise) × 10$^4$ | 6.0 | 4.5 | 2.9 | 9.5 |
| Izod Impact Strength (notch, kg · cm/cm$^2$) | 14 | 17 | 23 | 9 |

TABLE 10

| | Example 30 | Example 31 | Example 32 | Comparative Example 10 |
|---|---|---|---|---|
| Composition (Parts by weight) | | | | |
| Polybutylene terephthalate | 90 | 80 | 60 | 100 |
| Aliphatic Polyester (A) | 10 | 20 | 40 | 0 |
| Melt Viscosity (230° C.) (poise) × 10$^3$ | 5.5 | 4.2 | 3.1 | 9.8 |
| Izod Impact Strength (notch, kg · cm/cm$^2$) | 9 | 14 | 19 | 5 |

TABLE 11

| | Example 33 | Example 34 | Example 35 | Comparative Example 11 |
|---|---|---|---|---|
| Composition (Parts by weight) | | | | |
| Glass-fiber reinforced polybutylene terephthalate | 90 | 80 | 60 | 100 |
| Aliphatic Polyester (A) | 10 | 20 | 40 | 0 |
| Melt Viscosity (230° C.) (poise) × 10$^3$ | 8.0 | 6.7 | 4.2 | 16.5 |
| Izod Impact Strength (notch, kg · cm/cm$^2$) | 18 | 26 | 31 | 9.5 |

TABLE 12

| | Example 36 | Example 37 | Example 38 | Comparative Example 12 |
|---|---|---|---|---|
| Composition (Parts by weight) | | | | |
| Glass-fiber reinforced polyethylene terephthalate | 90 | 80 | 60 | 100 |
| Aliphatic Polyester (A) | 10 | 20 | 40 | 0 |
| Melt Viscosity | 6.1 | 4.9 | 3.5 | 12.5 |

TABLE 12-continued

|  | Example 36 | Example 37 | Example 38 | Comparative Example 12 |
|---|---|---|---|---|
| (260° C.) (poise) × $10^3$ | | | | |
| Izod Impact Strength (notch, kg · cm/cm$^2$) | 16 | 21 | 27 | 9.0 |

EXAMPLES 39–41 AND COMPARATIVE EXAMPLE 13

Modified polyphenyleneoxide (GE Corp., NORYL®-PPO 534J; 60% by weight polyphenyleneoxide) and the aliphatic polyester (A) were dryblended in the weight ratio as shown in Table 13, and then melted and mixed with in a plastograph at 300° C. for 5 minutes, resulting in a polyphenyleneoxide resin composition. The melt viscosity of the polyphenyleneoxide resin composition was measured at 300° C. and the results are shown in Table 13. A sample 3.2 mm thick for the Izod impact strength test was obtained by compression-molding of the polyphenyleneoxide composition at 300° C. and the impact strength of the test sample thus obtained was measured. The results are shown in Table 13.

EXAMPLES 42–44 AND COMPARATIVE EXAMPLE 14

A polyphenyleneoxide resin composition was prepared in the same way as in Example 39, except that glass-fiber reinforced modified polyphenyleneoxide (GE Corp., NORYL®-GFN 3J; approximately 20–30% by weight polyphenyleneoxide and 30% by weight glass fibers, with glass fibers 20 μm diameter and 0.2–1.0 mm long) and the aliphatic polyester (A) were dryblended in the weight ratio as shown in Table 14. The melt viscosity and the Izod impact strength of the polyphenyleneoxide resin composition thus obtained were measured in the same way as in Example 39 and the results are shown in Table 14.

TABLE 13

|  | Example 39 | Example 40 | Example 41 | Comparative Example 13 |
|---|---|---|---|---|
| Composition (parts by weight) | | | | |
| Modified polyphenylene oxide | 90 | 80 | 60 | 100 |
| Aliphatic Polyester (A) | 10 | 20 | 40 | 0 |
| Melt Viscosity (300° C.) (poise) × $10^3$ | 3.6 | 3.1 | 2.2 | 6.1 |
| Izod Impact Strength (notch, kg · cm/cm$^2$) | 16 | 18 | 23 | 11 |

TABLE 14

|  | Example 39 | Example 40 | Example 41 | Comparative Example 13 |
|---|---|---|---|---|
| Composition (parts by weight) | | | | |
| Glass-fiber reinforced modified polyphenylene oxide | 90 | 80 | 60 | 100 |
| Aliphatic Polyester (A) | 10 | 20 | 40 | 0 |

TABLE 14-continued

|  | Example 39 | Example 40 | Example 41 | Comparative Example 13 |
|---|---|---|---|---|
| Melt Viscosity (300° C.) (poise) × $10^3$ | 2.5 | 1.8 | 1.1 | 5.2 |
| Izod Impact Strength (notch, kg · cm/cm$^2$) | 15 | 17 | 20 | 10 |

EXAMPLES 45–47 AND COMPARATIVE EXAMPLE 15

Polycarbonate (Teijin Kasei Corp., PANLITE® L-1225L) and the aliphatic polyester (A) were dryblended in the weight ratio as shown in Table 15, and then melted and mixed with in a plastograph at 280° C. for 5 minutes, resulting in a polycarbonate composition. The melt viscosity of the polycarbonate resin composition was measured at 270° C. The results are shown in Table 15. Samples 3.2 mm thick and 6.4 mm thick, respectively, for the Izod impact strength test was obtained by compression-molding of this resin composition at 280° C. and the impact strengths of each test sample thus obtained were measured. The results are shown in Table 15.

EXAMPLES 48–50 AND COMPARATIVE EXAMPLE 16

Glass-fiber reinforced polycarbonate (Teijin Kasei Corp., PANLITE® G-3130; 30% by weight glass fibers, with glass fibers 20 μm diameter and 0.2–1.0 mm long) and the aliphatic polyester (A) were dryblended in the weight ratio as shown in Table 16, and then melted and mixed with in a plastograph at 320° C. for 5 minutes, resulting in a polycarbonate composition. The melt viscosity of the polycarbonate resin composition was measured at 260° C. The results are shown in Table 16. A sample 3.2 mm thick for the Izod impact strength test was obtained by compression-molding of this resin composition at 300° C. and the impact strength of the test sample thus obtained was measured. The results are shown in Table 16.

TABLE 15

|  | Example 45 | Example 46 | Example 47 | Comparative Example 15 |
|---|---|---|---|---|
| Composition (parts by weight) | | | | |
| Polycarbonate | 90 | 80 | 60 | 100 |
| Aliphatic polyester (A) | 10 | 20 | 40 | 0 |
| Melt viscosity (280° C.) (poise) × $10^3$ | 4.3 | 2.4 | 1.7 | 7.2 |
| Izod impact strength (3.2 mm thick) (notch, kg · cm/cm$^2$) | 80 | 86 | 91 | 76 |
| Izod impact strength (6.4 mm thick) (notch, kg · cm/cm$^2$) | 21 | 29 | 45 | 10 |

TABLE 16

|  | Example 48 | Example 49 | Example 50 | Comparative Example 16 |
|---|---|---|---|---|
| Composition (parts by weight) | | | | |
| Glass-fiber | 90 | 80 | 60 | 100 |

TABLE 16-continued

|  | Example 48 | Example 49 | Example 50 | Comparative Example 16 |
|---|---|---|---|---|
| reinforced polycarbonate |  |  |  |  |
| Aliphatic polyester (A) | 10 | 20 | 40 | 0 |
| Melt viscosity (260° C.) (poise) × 10³ | 14.5 | 9.1 | 7.1 | 26.0 |
| Izod impact strength (3.2 mm thick) (notch, kg · cm/cm²) | 39 | 47 | 63 | 21 |

EXAMPLES 51–53 AND COMPARATIVE EXAMPLE 17

Polyoxymethylene (Asahi Chemical Industry Co., Ltd., TENAC 5010) and the aliphatic polyester (A) were dryblended in the weight ratio as shown in Table 17, and then melted and mixed with in a plastograph at 210° C. for 5 minutes, resulting in a polyoxymethylene composition. The melt viscosity of this resin composition was measured at 210° C. A sample 3.2 mm thick for the Izod impact strength test was obtained by compression-molding of this resin composition at 210° C. and the impact strength of the test sample thus obtained was measured. The results are shown in Table 17.

EXAMPLES 54–56 AND COMPARATIVE EXAMPLE 18

Glass-fiber reinforced polyoxymethylene (Asahi Chemical Industry Co., Ltd., TENAC GA520; 20% by weight glass fibers, with glass fibers 20 μm diameter and 0.2–1.0 mm long) and the aliphatic polyester (A) were dryblended in the weight ratio as shown in Table 18, and then melted and mixed with in a plastograph at 220° C. for 5 minutes, resulting in a polyoxymethylene composition. The melt viscosity of this resin composition was measured at 220° C. A sample 3.2 mm thick for the Izod impact strength test was obtained by compression-molding of this resin composition at 220° C. and the impact strength of the test sample thus obtained was measured. The results are shown in Table 18.

TABLE 17

|  | Example 51 | Example 52 | Example 53 | Comparative Example 17 |
|---|---|---|---|---|
| Composition (parts by weight) |  |  |  |  |
| Polyoxymethylene | 90 | 80 | 60 | 100 |
| Aliphatic polyester (A) | 10 | 20 | 40 | 0 |
| Melt viscosity (210° C.) (poise) × 10³ | 4.2 | 2.9 | 1.8 | 7.9 |
| Izod impact strength (3.2 mm thick) (notch, kg · cm/cm²) | 12 | 18 | 24 | 7 |

TABLE 18

|  | Example 54 | Example 55 | Example 56 | Comparative Example 18 |
|---|---|---|---|---|
| Composition (parts by weight) |  |  |  |  |
| Glass-fiber reinforced polyoxymethylene | 90 | 80 | 60 | 100 |
| Aliphatic polyester (A) | 10 | 20 | 40 | 0 |
| Melt viscosity (220° C.) (poise) × 10³ | 7.2 | 5.7 | 3.1 | 10.5 |
| Izod impact strength (3.2 mm thick) (notch, kg · cm/cm²) | 7 | 9 | 13 | 4 |

EXAMPLES 57–59 AND COMPARATIVE EXAMPLE 19

Polyarylate (Unitika Ltd., U polymer® U-8000) and the aliphatic polyester (B) were dryblended in the weight ratio as shown in Table 19, and then melted and mixed with in a plastograph at 280° C. for 10 minutes, resulting in a polyarylate resin composition. A sample of 3 mm thick was obtained by compression-molding of this resin composition at 290° C. and the surface hardness and the Vicat softening temperature thereof were measured. The results are shown in Table 19.

EXAMPLES 60–62 AND COMPARATIVE EXAMPLE 20

Liquid crystal polyester (Unitika Ltd., LODRUN® LC-3000) and the aliphatic polyester (B) were dryblended in the weight ratio as shown in Table 20, and then melted and mixed with in a plastograph at 260° C. for 10 minutes, resulting in a liquid crystal polyester resin composition. A sample of 3 mm thick was obtained by compression-molding of this resin composition at 240° C. and the surface hardness and the Vicat softening temperature thereof were measured. The results are shown in Table 20.

EXAMPLES 63–65 AND COMPARATIVE EXAMPLE 21

Polycarbonate (Teijin Kasei Corp., PANLITE® L-1225L) and the aliphatic polyester (B) were dryblended in the weight ratio as shown in Table 21, and then melted and mixed with in a plastograph at 280° C. for 10 minutes, resulting in a polycarbonate resin composition. A sample of 3 mm thick was obtained by compression-molding of this resin composition at 280° C. and the surface hardness and the Vicat softening temperature thereof were measured. The results are shown in Table 21.

EXAMPLES 66–68 AND COMPARATIVE EXAMPLE 22

Polyamide (Toyobo Co., Ltd., T-802) and the aliphatic polyester (B) were dryblended in the weight ratio as shown in Table 22, and then melted and mixed with in a plastograph at 250° C. for 10 minutes, resulting in a polyamide resin composition. A sample of 3 mm thick was obtained by compression-molding of this resin composition at 250° C. and the surface hardness and the Vicat softening temperature thereof were measured. The results are shown in Table 22.

EXAMPLES 69–71 AND COMPARATIVE EXAMPLE 23

Polybutylene terephthalate (Teijin Ltd., TEIJIN PBT-C7000) and the aliphatic polyester (B) were dryblended in the weight ratio as shown in Table 23, and then melted and mixed with in a plastograph at 240° C. for 10 minutes, resulting in a polybutylene terephthalate resin composition. A sample of 3 mm thick was obtained by compression-molding of this resin composition at 260° C. and the surface hardness and the Vicat softening temperature thereof were measured. The results are shown in Table 23.

EXAMPLES 72–74 AND COMPARATIVE EXAMPLE 24

Polyethylene terephthalate (Teijin Ltd., TEIJIN PET-TR8550) and the aliphatic polyester (B) were dryblended in the weight ratio as shown in Table 24, and then melted and mixed with in a plastograph at 260° C. for 10 minutes, resulting in a polyethylene terephthalate resin composition. A sample of 3 mm thick was obtained by compression-molding of this resin composition at 270° C. and the surface hardness and the Vicat softening temperature thereof were measured. The results are shown in Table 24.

TABLE 19

|  | Example 57 | Example 58 | Example 59 | Comparative Example 19 |
|---|---|---|---|---|
| Composition (Parts by weight) | | | | |
| Polyarylate | 10 | 20 | 30 | 0 |
| Aliphatic Polyester (B) | 90 | 80 | 70 | 100 |
| Surface Hardness (Shore D) | 40 | 43 | 46 | 36 |
| Vicat Softening Point (°C.) | 138 | 160 | 181 | 110 |

TABLE 20

|  | Example 60 | Example 61 | Example 62 | Comparative Example 20 |
|---|---|---|---|---|
| Composition (Parts by weight) | | | | |
| Liquid Crystal Polyester | 10 | 20 | 30 | 0 |
| Aliphatic Polyester (B) | 90 | 80 | 70 | 100 |
| Surface Hardness (Shore D) | 38 | 41 | 43 | 36 |
| Vicat Softening Point (°C.) | 145 | 163 | 179 | 110 |

TABLE 21

|  | Example 63 | Example 64 | Example 65 | Comparative Example 21 |
|---|---|---|---|---|
| Composition (Parts by weight) | | | | |
| Polycarbonate | 10 | 20 | 30 | 0 |
| Aliphatic Polyester (B) | 90 | 80 | 70 | 100 |
| Surface Hardness (Shore D) | 39 | 42 | 46 | 36 |
| Vicat Softening Point (°C.) | 142 | 170 | 183 | 110 |

TABLE 22

|  | Example 66 | Example 67 | Example 68 | Comparative Example 22 |
|---|---|---|---|---|
| Composition (Parts by weight) | | | | |
| Polyamide | 10 | 20 | 30 | 0 |
| Aliphatic Polyester (B) | 90 | 80 | 70 | 100 |
| Surface Hardness (Shore D) | 37 | 39 | 43 | 36 |

TABLE 22-continued

|  | Example 66 | Example 67 | Example 68 | Comparative Example 22 |
|---|---|---|---|---|
| (Shore D) | | | | |
| Vicat Softening Point (°C.) | 142 | 157 | 171 | 110 |

TABLE 23

|  | Example 69 | Example 70 | Example 71 | Comparative Example 23 |
|---|---|---|---|---|
| Composition (Parts by weight) | | | | |
| Polybutylene terephthalate | 10 | 20 | 30 | 0 |
| Aliphatic Polyester (B) | 90 | 80 | 70 | 100 |
| Surface Hardness (Shore D) | 37 | 38 | 41 | 36 |
| Vicat Softening Point (°C.) | 132 | 151 | 178 | 110 |

TABLE 24

|  | Example 72 | Example 73 | Example 74 | Comparative Example 24 |
|---|---|---|---|---|
| Composition (Parts by weight) | | | | |
| Polyethylene terephthalate | 10 | 20 | 30 | 0 |
| Aliphatic Polyester (B) | 90 | 80 | 70 | 100 |
| Surface Hardness (Shore D) | 37 | 37 | 42 | 36 |
| Vicat Softening Point (°C.) | 137 | 149 | 180 | 110 |

EXAMPLES 75–77 AND COMPARATIVE EXAMPLE 25

Modified polyphenyleneoxide (GE Corp., NORYL®-PPO 534J; approximately 60% by weight polyphenyleneoxide) and the aliphatic polyester (C) were dryblended in the weight ratio as shown in Table 25, and then melted and mixed with in a plastograph at 300° C. for 5 minutes, resulting in a polyphenyleneoxide resin composition. The melt viscosity of the polyphenyleneoxide resin composition was measured at 300° C. and the results are shown in Table 25. A sample 3.2 mm thick for the Izod impact strength test was obtained by compression-molding of the polyphenyleneoxide composition at 300° C. and the impact strength of the test sample thus obtained was measured. The results are shown in Table 25.

EXAMPLES 78–80 AND COMPARATIVE EXAMPLE 26

Polyoxymethylene (Asahi Chemical Industry, Co., Ltd., TENAC® 5010) and the aliphatic polyester (C) were dryblended in the weight ratio as shown in Table 26, and then melted and mixed with in a plastograph at 210° C. for 5 minutes, resulting in a polyoxymethylene resin composition. The melt viscosity of the polyphenyleneoxide resin composition was measured at 210° C. A sample 3.2 mm thick for the Izod impact strength test was obtained by compression-molding of the polyphenyleneoxide composition at 210° C. and the impact strength of the test sample thus obtained was measured. The results are shown in Table 26.

TABLE 25

|  | Example 75 | Example 76 | Example 77 | Comparative Example 25 |
|---|---|---|---|---|
| Composition (Parts by weight) |  |  |  |  |
| Modified Polyphenyleneoxide | 90 | 80 | 60 | 100 |
| Aliphatic Polyester (C) | 10 | 20 | 40 | 0 |
| Melt Viscosity (300° C.) (poise) × 10³ | 3.3 | 2.8 | 1.9 | 6.1 |
| Izod Impact Strength (notch, kg · cm/cm²) | 17 | 20 | 24 | 11 |

TABLE 26

|  | Example 78 | Example 79 | Example 80 | Comparative Example 26 |
|---|---|---|---|---|
| Composition (Parts by weight) |  |  |  |  |
| Polyoxymethylene | 90 | 80 | 60 | 100 |
| Aliphatic Polyester (C) | 10 | 20 | 40 | 0 |
| Melt Viscosity (210° C.) (poise) × 10³ | 4.0 | 2.6 | 1.4 | 7.9 |
| Izod Impact Strength (notch, Kg · cm/cm²) | 13 | 18 | 26 | 7 |

EXAMPLES 81–83 AND COMPARATIVE EXAMPLE 27

Polyarylate (Unitika Ltd., U polymer ® U-8000) and the aliphatic polyester (D) were dryblended in the weight ratio as shown in Table 27, and then melted and mixed with in a plastograph at 280° C. for 5 minutes, resulting in a polyarylate resin composition. The melt viscosity of this resin composition was measured at 260° C. A sample of 3.2 mm thick for the Izod impact strength test and a No. 3 dumbbell of 2.0 mm thick were obtained by compression-molding of this resin composition at 290° C. and the impact strength of the test sample and the tensile strength of the dumbbell thus obtained were measured, respectively. The results are shown in Table 27.

EXAMPLES 84–86 AND COMPARATIVE EXAMPLE 28

Polycarbonate (Teijin Kasei Corp., PANLITE ® L-1225L) and the aliphatic polyester (D) were dryblended in the weight ratio as shown in Table 28, and then melted and mixed with in a plastograph at 280° C. for 5 minutes, resulting in a polycarbonate resin composition. The melt viscosity of the polycarbonate resin composition was measured at 270° C. The results are shown in Table 28. A sample 3.2 mm thick for the Izod impact strength test was obtained by compression-molding of this resin composition at 280° C. and the impact strength of the test sample was measured. The results are shown in Table 28.

TABLE 27

|  | Example 81 | Example 82 | Example 83 | Comparative Example 27 |
|---|---|---|---|---|
| Composition (Parts by weight) |  |  |  |  |
| Polyarylate | 90 | 80 | 60 | 100 |
| Aliphatic Polyester (D) | 10 | 20 | 40 | 0 |
| Melt Viscosity (260° C.) (poise) × 10⁴ | 4.1 | 3.2 | 1.9 | 7.6 |
| Izod Impact Strength (notch, Kg · cm/cm²) | 19 | 24 | 35 | 11 |
| Tensile Strength (kg/cm²) | 750 | 710 | 680 | 790 |

TABLE 28

|  | Example 84 | Example 85 | Example 86 | Comparative Example 28 |
|---|---|---|---|---|
| Composition (Parts by weight) |  |  |  |  |
| Polycarbonate | 90 | 80 | 60 | 100 |
| Aliphatic Polyester (D) | 10 | 20 | 40 | 0 |
| Melt Viscosity (280° C.) (poise) × 10³ | 4.1 | 2.1 | 1.5 | 7.2 |
| Izod Impact Strength (notch, Kg · cm/cm²) | 83 | 87 | 95 | 76 |

EXAMPLES 87–89 AND COMPARATIVE EXAMPLE 29

Liquid crystal polyester (Unitika Ltd., LODRUN ® LC-3000) and the aliphatic polyester (E) were dryblended in the weight ratio as shown in Table 29, and then melted and mixed with in a plastograph at 260° C. for 10 minutes, resulting in a liquid crystal polyester resin composition. A sample of 3 mm thick was obtained by compression-molding of this resin composition at 240° C. and the surface hardness and the Vicat softening temperature thereof were measured. The results are shown in Table 29.

EXAMPLES 90–92 AND COMPARATIVE EXAMPLE 30

Polyethylene terephthalate (Teijin Ltd., TEIJIN PET-TR8550) and the aliphatic polyester (E) were dryblended in the weight ratio as shown in Table 30, and then melted and mixed with in a plastograph at 260° C. for 10 minutes, resulting in a polyethylene terephthalate resin composition. A sample of 3 mm thick was obtained by compression-molding of this resin composition at 270° C. and the surface hardness and the Vicat softening temperature thereof were measured. The results are shown in Table 30.

TABLE 29

|  | Example 87 | Example 88 | Example 89 | Comparative Example 29 |
|---|---|---|---|---|
| Composition (Parts by weight) |  |  |  |  |
| Liquid Crystal Polyester | 10 | 20 | 30 | 0 |
| Aliphatic Polyester (E) | 90 | 80 | 70 | 100 |
| Surface Hardness (Shore D) | 37 | 40 | 45 | 36 |
| Vicat Softening Point (°C.) | 139 | 158 | 178 | 105 |

TABLE 30

|  | Example 90 | Example 91 | Example 92 | Comparative Example 30 |
|---|---|---|---|---|
| Composition (Parts by weight) |  |  |  |  |
| Polyethylene terephthalate | 10 | 20 | 30 | 0 |
| Aliphatic Polyester (E) | 90 | 80 | 70 | 100 |
| Surface Hardness (Shore D) | 37 | 38 | 43 | 36 |
| Vicat Softening Point (°C.) | 132 | 149 | 177 | 105 |

EXAMPLES 93-95 AND COMPARATIVE EXAMPLE 31

Glass-fiber reinforced polyphenylenesulfide (Phillips Petroleum International Inc., RYTON® R-4; 40% by weight glass fibers, with glass fibers 20 μm diameter and 0.2-1.0 mm long) and the aliphatic polyester (F) were dryblended in the weight ratio as shown in Table 31, and then melted and mixed with in a plastograph at 300° C. for 5 minutes, resulting in a reinforced polyphenylenesulfide resin composition. The melt viscosity of this resin composition was measured at 300° C. A sample 3.2 mm thick for the Izod impact strength test was obtained by compression-molding of this resin composition at 310° C. and the impact strength of the test sample thus obtained was measured. The results are shown in Table 31.

EXAMPLES 96-98 AND COMPARATIVE EXAMPLE 32

Glass-fiber reinforced polyethylene terephthalate (Teijin Ltd., TEIJIN FR-PET®-C3030; 30% by weight glass fibers, with glass fibers 20 μm diameter and 0.2-1.0 mm long) and the aliphatic polyester (F) were dryblended in the weight ratio as shown in Table 32, and then melted and mixed with in a plastograph at 260° C. for 5 minutes, resulting in a reinforced polyethylene terephthalate resin composition. The melt viscosity of this resin composition was measured at 260° C. A sample 3.2 mm thick for the Izod impact strength test was obtained by compression-molding of this resin composition at 270° C. and the impact strength of the test sample thus obtained was measured. The results are shown in Table 32.

TABLE 31

|  | Example 93 | Example 94 | Example 95 | Comparative Example 31 |
|---|---|---|---|---|
| Composition (Parts by weight) |  |  |  |  |
| Glass-fiber reinforced Polyphenylenesulfide | 90 | 80 | 60 | 100 |
| Aliphatic Polyester (F) | 10 | 20 | 40 | 0 |
| Melt Viscosity (300° C.) (poise) × $10^4$ | 5.9 | 4.3 | 2.8 | 9.5 |
| Izod Impact Strength (notch, Kg · cm/cm$^2$) | 16 | 19 | 24 | 9 |

TABLE 32

|  | Example 96 | Example 97 | Example 98 | Comparative Example 32 |
|---|---|---|---|---|
| Composition (Parts by weight) |  |  |  |  |
| Glass-fiber reinforced Polyethyleneterephthalate | 90 | 80 | 60 | 100 |
| Aliphatic Polyester (F) | 10 | 20 | 40 | 0 |
| Melt Viscosity (260° C.) (poise) × $10^3$ | 6.0 | 4.8 | 3.1 | 12.5 |
| Izod Impact Strength (notch, Kg · cm/cm$^2$) | 18 | 22 | 30 | 9 |

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An engineering plastic composition comprising an engineering plastic material and an aliphatic polyester,
    wherein said aliphatic polyester is produced from a monomer component containing:
    (a) at least one member selected from the group consisting of an aliphatic dicarboxylic acid of formula I, lower esters and halides thereof;
    (b) an aliphatic diol; and
    (c) at least one member selected from the group consisting of a dihydroxy compound of formula II and acetylides thereof:
    at least one member selected from the group consisting of said dihydroxy compound and the acetylides thereof being present in an amount from 0.1 to 30 mol% based on a total amount of monomer of said aliphatic polyester; and a mixing ratio of said aliphatic polyester in said engineering plastic composition being in the range of 1 to 50% by weight:

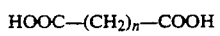

HOOC—(CH$_2$)$_n$—COOH wherein n is an integer of 0 to 10

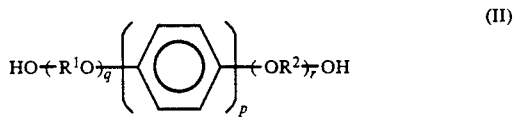

wherein R$^1$ and R$^2$ are, independently, alkylene, p is 3 or 4, and q and r, independently, are 0 or integers of 1 or more.

2. An engineering plastic composition according to claim 1,
    wherein said engineering plastic material is at least one selected from the group consisting of polyetherimide, polyarylketone, aromatic polysulfone resin, polyarylenesulfide, polyarylate, saturated polyester, polyamide-imide, polycarbonate, polyphenyleneoxide, polyamide, and polyoxymethylene.

3. An engineering plastic composition according to claim 2, wherein said saturated polyester is liquid crystal polyester.

4. An engineering plastic composition according to claim 1,
wherein said dihydroxy compound is at least one selected from the group consisting of 4,4''-dihydroxy-p-terphenyl, 4,4'''-dihydroxy-p-quarterphenyl, and 4,4'''-di(2-hydroxyethoxy)-p-quarterphenyl.

5. An engineering plastic composition according to claim 1 further comprising reinforcing fibers,
wherein said reinforcing fibers are present in an amount of from 1.0 to 400 parts by weight for each 100 parts by weight of said engineering plastic composition.

6. An engineering plastic composition according to claim 5,
wherein said reinforcing fiber is at least one selected from the group consisting of glass fibers, carbon fibers, boron fibers, silicon carbide fibers, graphite fibers, alumina fibers, amorphous-metal fibers, silicon-titanium-carbon inorganic fibers, and aramide fibers.

7. An article that is obtained from an engineering plastic composition according to claim 1 by a melt-molding technique.

8. An article according to claim 7, wherein said melt-molding technique is one selected from the group consisting of compression molding, extrusion molding, injection molding, and blow-molding.

9. An engineering plastic composition according to claim 1,
wherein a mixing ratio of said aliphatic polyester is in the range of 3 of 40% by weight.

10. An engineering plastic composition according to claim 1,
wherein at least one member selected from the group consisting of said dihydroxy compound and the acetylides thereof is present in an amount from 0.5 to 20 mol % based on the total amount of monomer of said aliphatic polyester.

11. An engineering plastic composition according to claim 1,
wherein at least one member selected from the group consisting of said dihydroxy compound and the acetylides thereof is present in an amount from 1.0 to 10 mol % based on the total amount of monomer of said aliphatic polyester.

12. An engineering plastic composition according to claim 1,
wherein said aliphatic dicarboxylic acid is at least one member selected from the group consisting of oxalic acid, malonic acid, succinic acid, glutaric acid, adipic acid, suberic acid and sebacic acid.

13. An engineering plastic composition according to claim 1,
wherein said monomer component further contains at least one member selected from the group consisting of a monohydroxy compound of formula III and acetylides thereof:

wherein $R^3$ is alkylene, l is 2 or 3, and m is 0 or an integer of 1 or more.

14. An engineering plastic composition according to claim 1,
wherein said monomer component further contains at least one member selected from the group consisting of polysilicone having two hydroxyl groups, lactone, aromatic hydrocarboxylic acid, aromatic dicarboxylic acid and aromatic diol other than said dihydroxy compound.

15. An engineering plastic composition comprising an engineering plastic material and an aliphatic polyester,
wherein said aliphatic polyester is prepared by any of the following methods (a) through (e):
(a) a direct reaction of a monomer component containing an aliphatic dicarboxylic acid of formula I, an aliphatic diol and a dihydroxy compound of formula II;
(b) a reaction of a monomer component containing a lower ester of an aliphatic dicarboxylic acid of formula I, an aliphatic diol and a dihydroxy compound of formula II;
(c) a reaction of a monomer component containing a halide of an aliphatic dicarboxylic acid of formula I, an aliphatic diol and a dihydroxy compound of formula II in a solvent;
(d) a reaction of a monomer component containing a halide of an aliphatic dicarboxylic acid of formula I, a metal alcoholate of an aliphatic diol and a metal alcoholate of an aliphatic diol and a metal alcoholate of a dihydroxy compound of formula II; and
(e) a transesterification reaction of a monomer component containing an aliphatic dicarboxylic acid of formula I, an acetylide of an aliphatic diol and an acetylide of a dihydroxy compound of formula II;
wherein said dihydroxy compound or ester thereof is present in an amount from 0.1 to 30 mol % based on a total amount of monomer of said aliphatic polyester; and a mixing ratio of said aliphatic polyester in said engineering plastic composition is in the range of 1 of 50% by weight:

wherein n is an integer of 0 to 10;

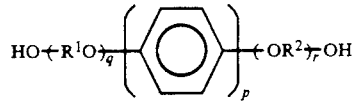

wherein $R^1$ and $R^2$ are, independently, alkylene, p is 3 or 4, and q and r, independently, are 0 or integers of 1 or more.

16. An engineering plastic composition according to claim 15,
wherein said monomer component further includes at least one member selected from the group consisting of a monohydroxy compound of formula III and acetylides thereof:

(III)

wherein $R^3$ is alkylene, l is 2 or 3, and m is 0 or an integer of 1 or more.

17. An engineering plastic composition comprising an engineering plastic material and an aliphatic polyester, wherein said aliphatic polyester contains,
a residue of an aliphatic dicarboxylic acid of formula I;
a residue of an aliphatic diol; and
a residue of a dihydroxy compound of formula II:
said residue of said dihydroxy compound being present in an amount of from 0.1 to 30 mol % based on a total amount of monomer of said aliphatic polyester when calculated in terms of said dihydroxy compound of formula II; and a mixing ratio of said aliphatic polyester being in the range of 1 to 50% by weight

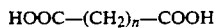

wherein n is an integer of 0 to 10;

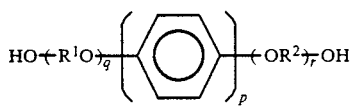
(II)

wherein $R^1$ and $R^2$ are, independently, alkylene, p is 3 or 4, and q and r, independently, are 0 or integers of 1 or more.

18. An engineering plastic composition according to claim 17, wherein a mixing ratio of said aliphatic polyester is in the range of 3 to 40% by weight.

19. An engineering plastic composition according to claim 17, wherein said residue of the dihydroxy compound is present in an amount of from 0.5 to 20 mol % based on a total amount of monomer of said aliphatic polyester when calculated in terms of said dihydroxy compound of formula II.

20. An engineering plastic composition according to claim 17, wherein said residue of the dihydroxy compound is present in an amount of from 0.1 to 10 mol % based on a total amount of monomer of said aliphatic polyester when calculated in terms of said dihydroxy compound of formula II.

21. An engineering plastic composition according to claim 17, wherein said aliphatic polyester further contains a residue of a monohydroxy compound of formula III.

(III)

wherein $R^3$ is alkylene, l is 2 or 3, and m is 0 or an integer of 1 or more.

* * * * *